(12) United States Patent
Chang

(10) Patent No.: US 9,429,739 B2
(45) Date of Patent: Aug. 30, 2016

(54) WIDE-ANGLE LENS ASSEMBLY

(71) Applicants: Sintai Optical (Shenzhen) Co., Ltd., Shenzhen, Guandong Province (CN); Asia Optical International Ltd., Tortola (GB)

(72) Inventor: Yu-Min Chang, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 0 days.

(21) Appl. No.: 14/673,961

(22) Filed: Mar. 31, 2015

(65) Prior Publication Data

US 2015/0277088 A1 Oct. 1, 2015

(30) Foreign Application Priority Data

Apr. 1, 2014 (TW) .............................. 103112085 A

(51) Int. Cl.
*G02B 13/04* (2006.01)
*G02B 9/60* (2006.01)

(52) U.S. Cl.
CPC ................. *G02B 13/04* (2013.01); *G02B 9/60* (2013.01)

(58) Field of Classification Search
CPC ....... G02B 13/00; G02B 13/04; G02B 13/06
USPC .................................................. 359/749–752
See application file for complete search history.

(56) References Cited

U.S. PATENT DOCUMENTS 7,595,938 B2 * 9/2009 Yamakawa et al. .......... 359/752

* cited by examiner

*Primary Examiner* — James Greece
(74) *Attorney, Agent, or Firm* — McClure, Qualey & Rodack, LLP

(57) ABSTRACT

A wide-angle lens assembly includes a first lens, a second lens, a third lens, a first stop, a fourth lens, a fifth lens and a sixth lens, all of which are arranged in sequence from an object side to an image side along an optical axis. The first lens is with negative refractive power. The second lens is with negative refractive power. The third lens is with positive refractive power. The fourth lens is with positive refractive power. The fifth lens is with negative refractive power. The sixth lens is with positive refractive power. The fifth lens satisfies $16.1 \leq Vd_5 \leq 23.9$, wherein $Vd_5$ is an Abbe number of the fifth lens.

13 Claims, 24 Drawing Sheets

WIDE-ANGLE LENS ASSEMBLY

BACKGROUND OF THE INVENTION

1. Field of the Invention

The invention relates to a lens assembly, and more particularly to a wide-angle lens assembly.

2. Description of the Related Art

Lens assemblies for vehicles have been gradually developed toward miniaturization and wide field of view. In addition to miniaturization and wide field of view, the lens assemblies for the vehicles are required to resist the change of environment temperature and ambient light intensity due to large variations of environment temperature and ambient light intensity. However, the known wide-angle lens assembly can't satisfy such requirements. Therefore, a wide-angle lens assembly with new structure to meet the requirements of miniaturization, wide field of view, resistance to environment temperature change and resistance to ambient light intensity change is needed.

BRIEF SUMMARY OF THE INVENTION

The invention provides a wide-angle lens assembly to solve the above problems. The wide-angle lens assembly of the invention is provided with characteristics of a shortened total lens length, a larger field of view exceeding or equaling 140 degrees, resistance to environment temperature change, resistance to ambient light intensity change and still has a good optical performance.

The wide-angle lens assembly in accordance with an exemplary embodiment of the invention includes a first lens, a second lens, a third lens, a first stop, a fourth lens, a fifth lens and a sixth lens, all of which are arranged in sequence from an object side to an image side along an optical axis. The first lens is with negative refractive power. The second lens is with negative refractive power. The third lens is with positive refractive power. The fourth lens is with positive refractive power. The fifth lens is with negative refractive power. The sixth lens is with positive refractive power. The fifth lens satisfies $16.1 \leq Vd_5 \leq 23.9$, wherein $Vd_5$ is an Abbe number of the fifth lens.

In another exemplary embodiment, the first lens satisfies $Nd_1/R_{11} \leq 0.185$, wherein $Nd_1$ is an index of refraction of the first lens and $R_{11}$ is a radius of curvature of an object side surface of the first lens.

In yet another exemplary embodiment, the first lens is a meniscus lens and includes a convex surface facing the object side; the second lens is a meniscus lens and includes a convex surface facing the object side; and the second lens satisfies $46 \leq Vd_2 \leq 60$, wherein $Vd_2$ is an Abbe number of the second lens.

In another exemplary embodiment, the third lens satisfies $22.5 \leq Vd_3 \leq 33.6$, wherein $Vd_3$ is an Abbe number of the third lens.

In yet another exemplary embodiment, the fourth lens further includes a convex surface facing the image side.

In another exemplary embodiment, the fifth lens and the sixth lens are cemented.

In yet another exemplary embodiment, no air space exists between the fifth lens and the sixth lens.

In another exemplary embodiment, the fifth lens is a convex-concave lens and includes a convex surface facing the object side and a concave surface facing the image side; and the sixth lens is a biconvex lens.

In yet another exemplary embodiment, the wide-angle lens assembly further includes a second stop disposed between the third lens and the fourth lens wherein the third lens, the fourth lens, the first stop and the second stop satisfy $0.09 \leq D_{ST}/D_{L3L4} \leq 0.35$, wherein $D_{ST}$ is an interval between the first stop and the second stop and $D_{L3L4}$ is an interval between the third lens and the fourth lens.

In another exemplary embodiment, the wide-angle lens assembly satisfies $FOV \geq 140$ degrees, wherein FOV is a field of view of the wide-angle lens assembly.

In yet another exemplary embodiment, the wide-angle lens assembly satisfies $FOV \leq 172$ degrees, wherein FOV is a field of view of the wide-angle lens assembly.

In another exemplary embodiment, the wide-angle lens assembly satisfies $FOV \geq 140$ degrees, wherein FOV is a field of view of the wide-angle lens assembly.

In yet another exemplary embodiment, the wide-angle lens assembly further satisfies $FOV \leq 172$ degrees, wherein FOV is a field of view of the wide-angle lens assembly.

In another exemplary embodiment, the wide-angle lens assembly further satisfies $FOV \geq 150$ degrees, wherein FOV is a field of view of the wide-angle lens assembly.

In yet another exemplary embodiment, the wide-angle lens assembly further satisfies $FOV \geq 172$ degrees, wherein FOV is a field of view of the wide-angle lens assembly.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
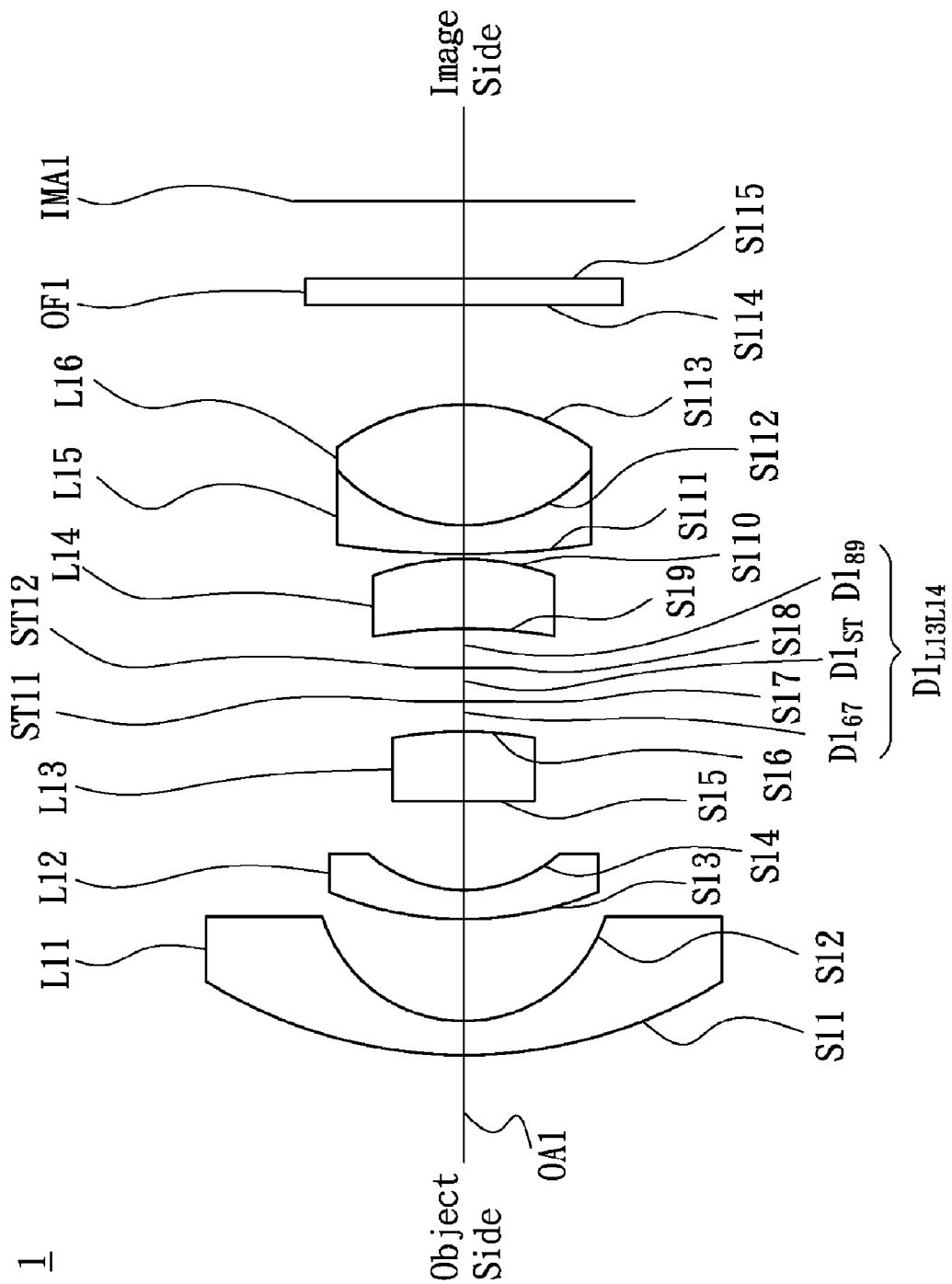
FIG. 1 is a lens layout of a wide-angle lens assembly in accordance with a first embodiment of the invention.

Referring to FIG. 1, FIG. 1 is a lens layout of a wide-angle lens assembly in accordance with a first embodiment of the invention. The wide-angle lens assembly 1 includes a first lens L11, a second lens L12, a third lens L13, a first stop ST11, a second stop ST12, a fourth lens L14, a fifth lens L15, a sixth lens L16 and an Optical filter OF1, all of which are arranged in sequence from an object side to an image side along an optical axis OA1. In operation, an image of light rays from the object side is formed at an image plane IMA1. The first lens L11 is a meniscus lens and with negative refractive power, wherein the object side surface S11 is a convex surface, the image side surface S12 is a concave surface and both of the object side surface S11 and image side surface S12 are spherical surfaces. The second lens L12 is a meniscus lens and with negative refractive power, wherein the object side surface S13 is a convex surface, the image side surface S14 is a concave surface and both of the object side surface S13 and image side surface S14 are spherical surfaces. The third lens L13 is with positive refractive power, wherein the object side surface S15 is a convex surface, the image side surface S16 is a concave surface and both of the object side surface S15 and image side surface S16 are spherical surfaces. The fourth lens L14 is a concave-convex lens and with positive refractive power, wherein the object side surface S19 is a concave surface, the image side surface S110 is a convex surface, the object side surface S19 is a spherical surface and the image side surface S110 is an aspheric surface. The fifth lens L15 is a convex-concave lens and with negative refractive power, wherein the object side surface S111 is a convex surface, the image side surface S112 is a concave surface and both of the object side surface S111 and image side surface S112 are spherical surfaces. The sixth lens L16 is a biconvex lens and with positive refractive power, wherein both of the object side surface S112 and image side surface S113 are spherical surfaces. The image side surface S112 of the fifth lens L15 and the object side surface S112 of the sixth lens L16 are cemented so as to reduce chromatic aberration. Both of the object side surface S114 and image side surface S115 of the optical filter OF1 are plane surfaces.

In order to maintain excellent optical performance of the wide-angle lens assembly in accordance with the first embodiment of the invention, the wide-angle lens assembly 1 must satisfies the following five conditions:

$$Nd1_1/R1_{11} \leq 0.185 \quad (1)$$

$$46 \leq Vd1_2 \leq 60 \quad (2)$$

$$22.5 \leq Vd1_3 \leq 33.6 \quad (3)$$

$$16.1 \leq Vd1_5 \leq 23.9 \quad (4)$$

$$0.09 \leq D1_{ST}/D1_{L13L14} \leq 0.35 \quad (5)$$

wherein $Nd1_1$ is an index of refraction of the first lens L11, $R1_{11}$ is a radius of curvature of the object side surface S11 of the first lens L11, $Vd1_2$ is an Abbe number of the second lens L12, $Vd1_3$ is an Abbe number of the third lens L13, $Vd1_5$ is an Abbe number of the fifth lens L15, $D1_{ST}$ is an interval between the first stop ST11 and the second stop ST12 and $D1_{L13L14}$ is an interval between the third lens L13 and the fourth lens L14. The wide-angle lens assembly 1 satisfying condition (4) can reduce chromatic aberration significantly.

By the above design of the lenses, stop ST11 and stop ST12, the wide-angle lens assembly 1 is provided with an increased field of view and an effective corrected aberration.

In order to achieve the above purposes and effectively enhance the optical performance, the wide-angle lens assembly 1 in accordance with the first embodiment of the invention is provided with the optical specifications shown in Table 1, which include the effective focal length, field of view, radius of curvature of each lens surface, thickness between adjacent surface, refractive index of each lens and Abbe number of each lens. Table 1 shows that the effective focal length is equal to 1.998 mm and field of view is equal to 160° for the wide-angle lens assembly 1 of the first embodiment of the invention.

TABLE 1

Effective Focal Length = 1.998 mm
Field of View = 160°

| Surface Number | Radius of Curvature (mm) | Thickness (mm) | Nd | Vd | Remark |
|---|---|---|---|---|---|
| S11 | 10.000 | 0.700 | 1.7900 | 52.32 | The First Lens L11 |
| S12 | 2.980 | 2.040 | | | |
| S13 | 7.254 | 0.600 | 1.7850 | 59.32 | The Second Lens L12 |
| S14 | 2.980 | 2.591 | | | |
| S15 | 50.993 | 1.400 | 2.0156 | 32.59 | The Third Lens L13 |
| S16 | −7.086 | 0.575 | | | Interval $D1_{67}$ |
| S17 | ∞ | 0.705 | | | The First Stop ST11 Interval $D1_{ST}$ |
| S18 | ∞ | 0.800 | | | The Second Stop ST12 Interval $D1_{89}$ |
| S19 | −10.722 | 1.400 | 1.7809 | 61.60 | The Fourth Lens L14 |
| S110 | −5.256 | 0.100 | | | |
| S111 | 9.258 | 0.600 | 1.85936 | 20.70 | The Fifth Lens L15 |
| S112 | 3.455 | 2.430 | 1.6100 | 88.67 | The Sixth Lens L16 |
| S113 | −6.232 | 2.000 | | | |
| S114 | ∞ | 0.550 | 1.5168 | 64.20 | Optical Filter OF1 |
| S115 | ∞ | 1.616 | | | |

The aspheric surface sag z of each lens in table 1 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the first embodiment, the conic constant k and the aspheric coefficients A, B, C, D, E, F of each surface are shown in Table 2.

TABLE 2

| Surface Number | k | A | B | C | D | E | F |
|---|---|---|---|---|---|---|---|
| S110 | 0 | 6.2559217E−04 | 1.4927660E−03 | −9.4253857E−04 | 2.6951239E−04 | −2.8551154E−05 | 5.2604729E−09 |

For the wide-angle lens assembly 1 of the first embodiment, the index of refraction $Nd1_1$ of the first lens L11 is equal to 1.7900, the radius of curvature $R1_{11}$ of the object side surface S11 of the first lens L11 is equal to 10.000 mm, the Abbe number $Vd1_2$ of the second lens L12 is equal to 59.32, the Abbe number $Vd1_3$ of the third lens L13 is equal to 32.59, the Abbe number $Vd1_5$ of the fifth lens L15 is equal to 20.70, the interval $D1_{ST}$ between the first stop ST11 and the second stop ST12 is equal to 0.705 mm, and the interval $D1_{L13L14}$ between the third lens L13 and the fourth lens L14 is equal to 2.080 mm. According to the above data, the following values can be obtained:

$$Nd1_1/R1_{11}=0.179,$$

$$Vd1_2=59.32,$$

$$Vd1_3=32.59,$$

$$Vd1_5=20.70,$$

$$D1_{ST}/D1_{L13L14}=0.34$$

which respectively satisfy the above conditions (1)-(5).

Figure 2A:
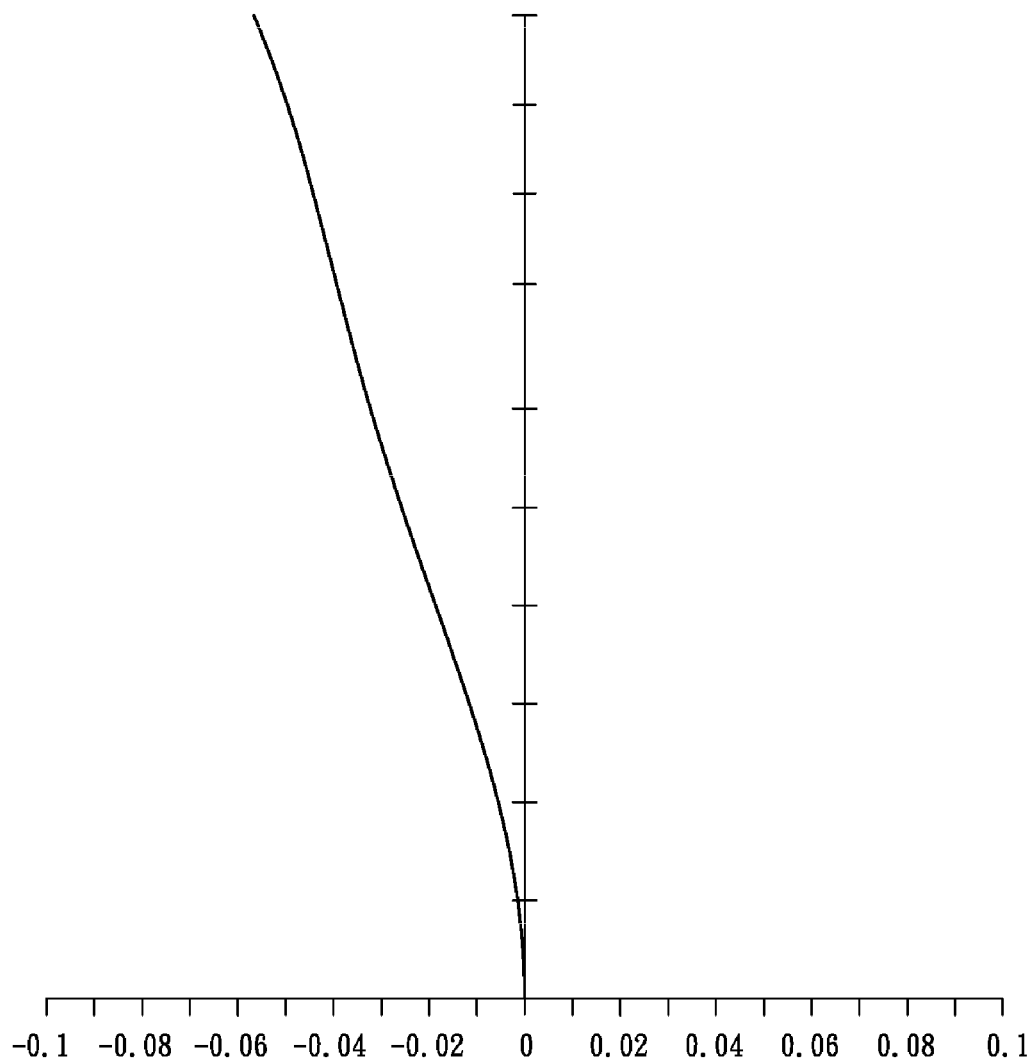
FIG. 2A depicts a longitudinal aberration diagram of the wide-angle lens assembly in accordance with the first embodiment of the invention.
Figure 2B:
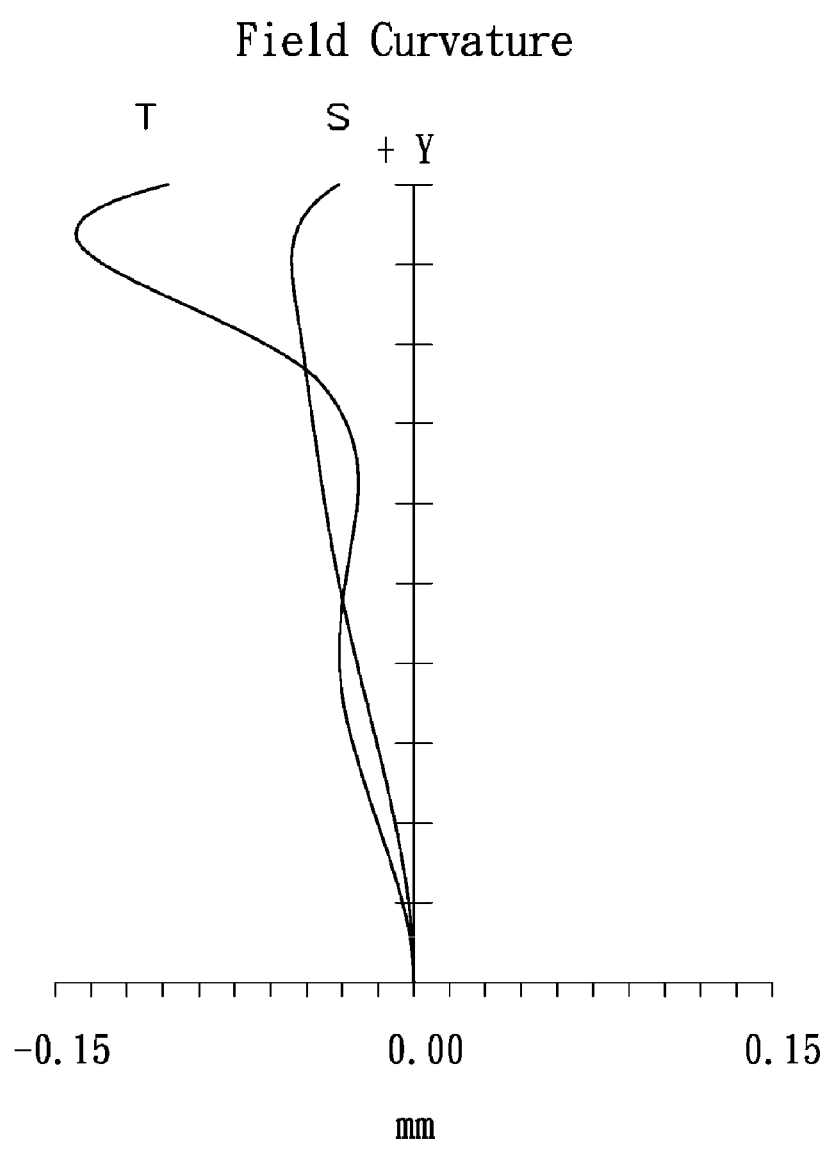
FIG. 2B is a field curvature diagram of the wide-angle lens assembly in accordance with the first embodiment of the invention.
Figure 2C:
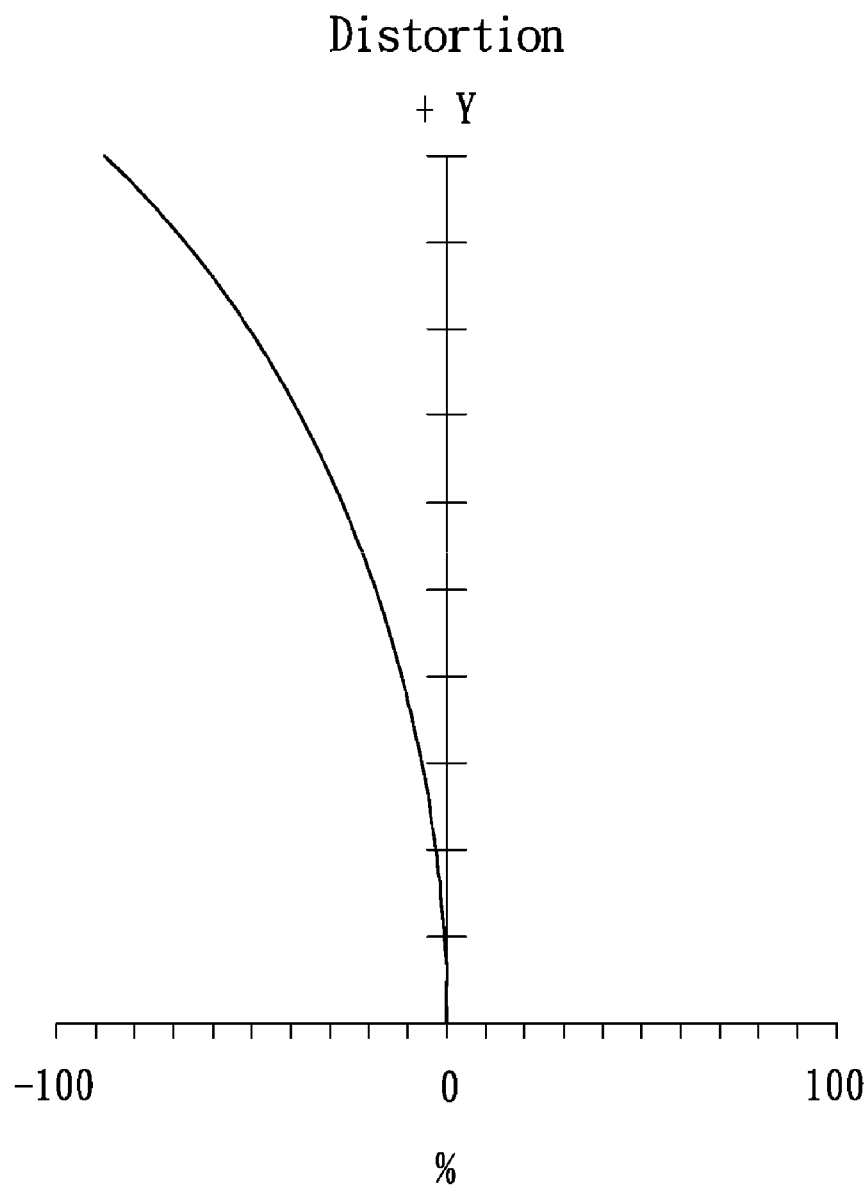
FIG. 2C is a distortion diagram of the wide-angle lens assembly in accordance with the first embodiment of the invention.
Figure 2D:
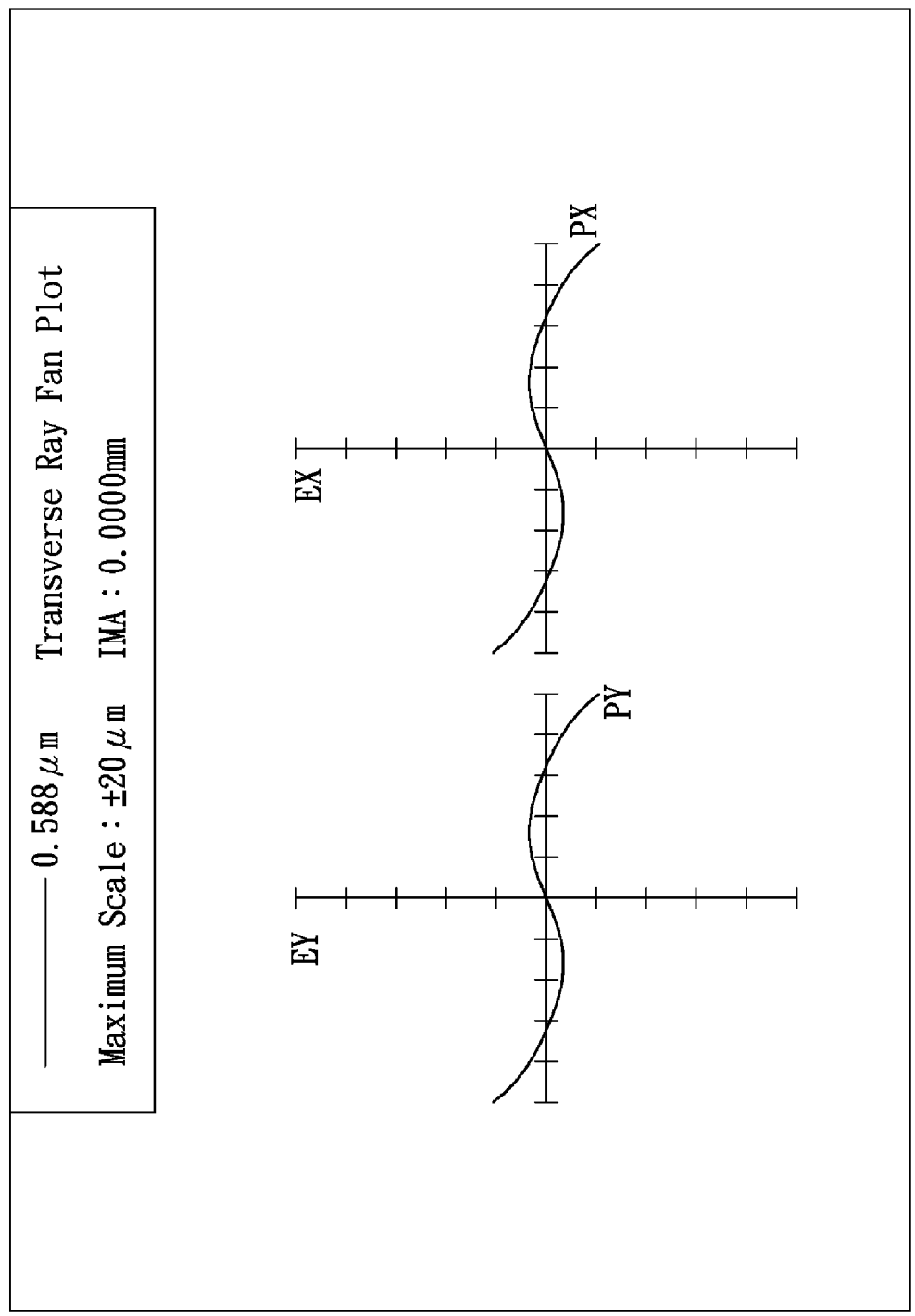
FIGS. 2D-2F are transverse ray fan diagrams of the wide-angle lens assembly in accordance with the first embodiment of the invention.
Figure 2E:
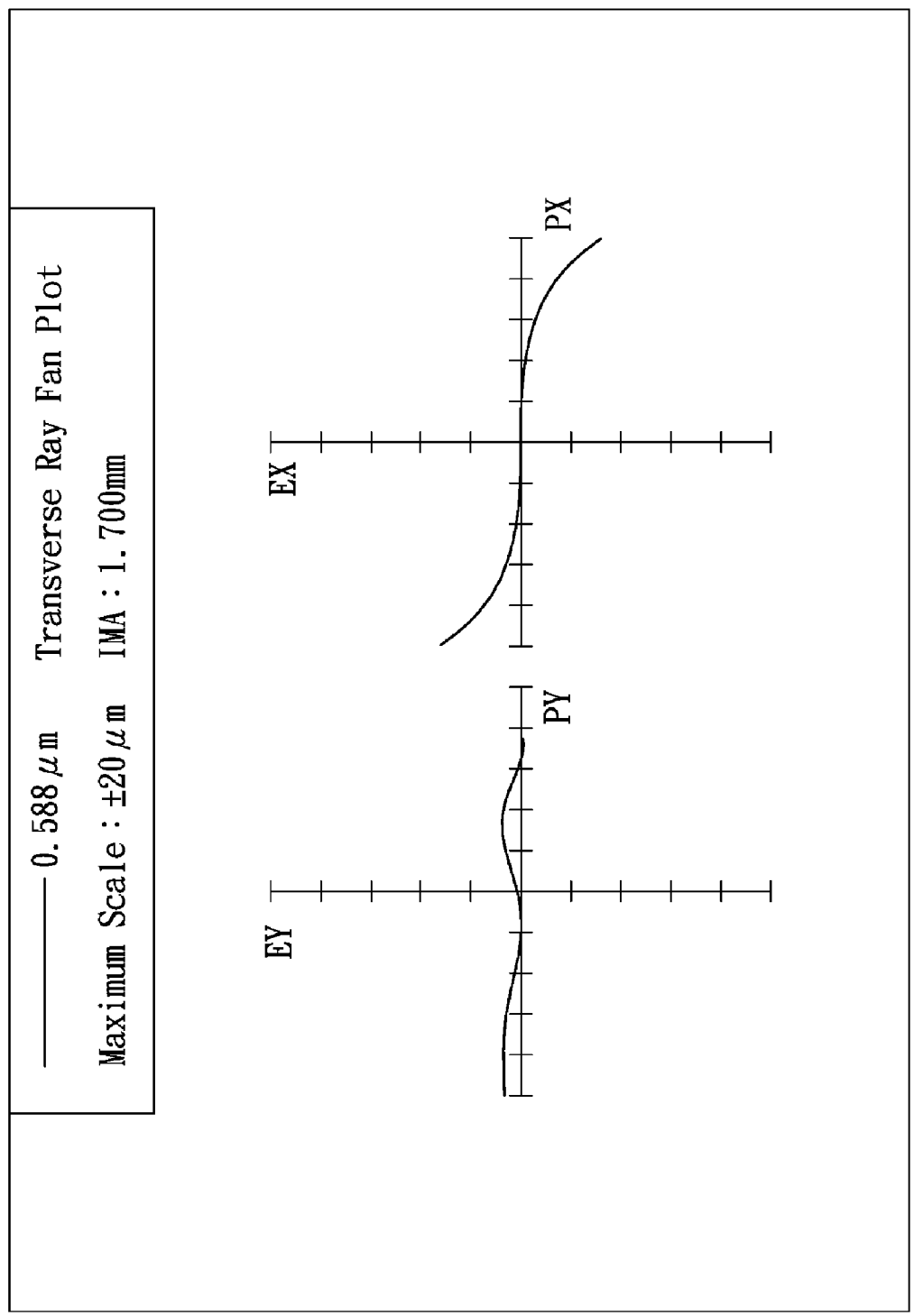
Figure 2F:
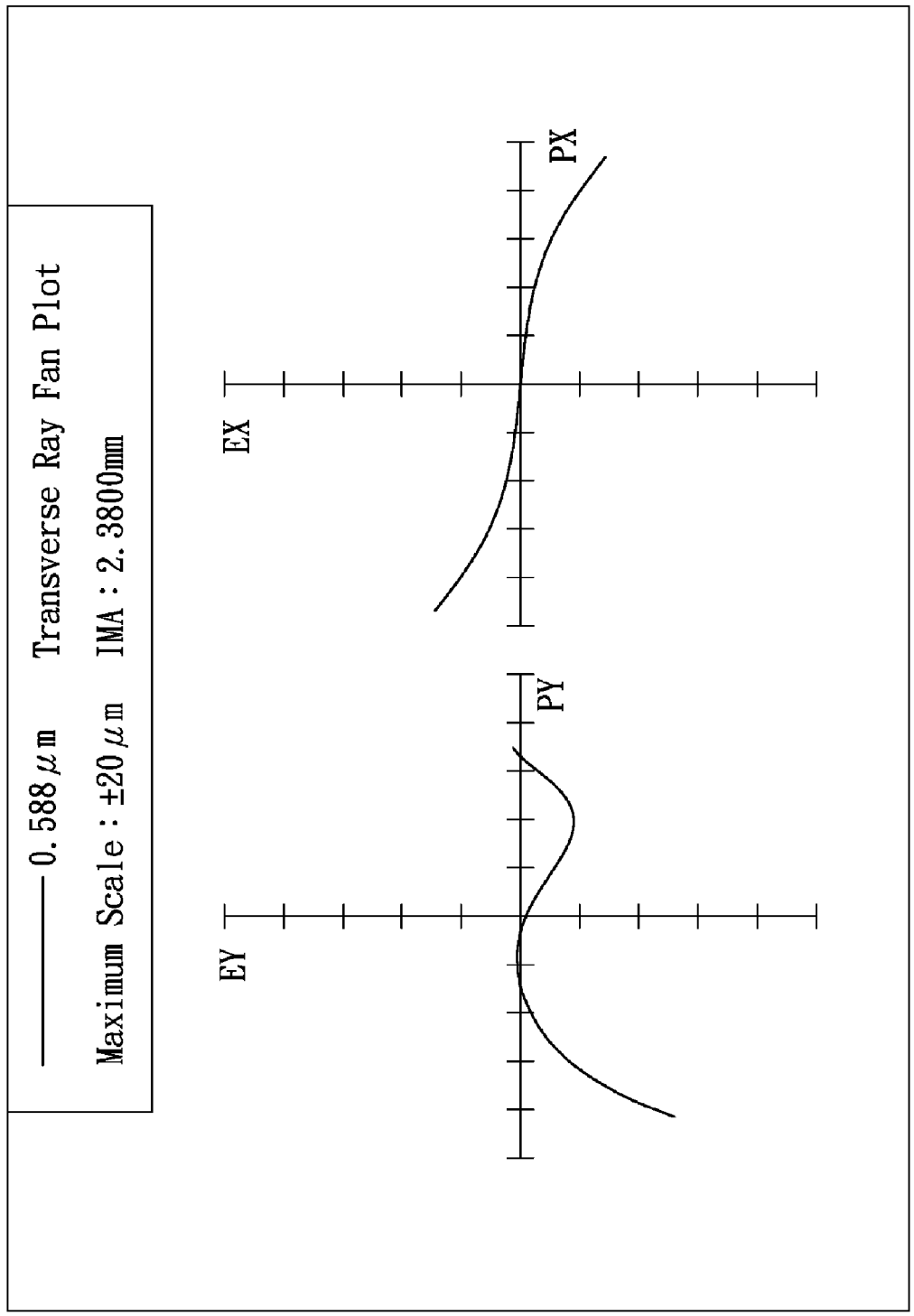
Figure 2G:
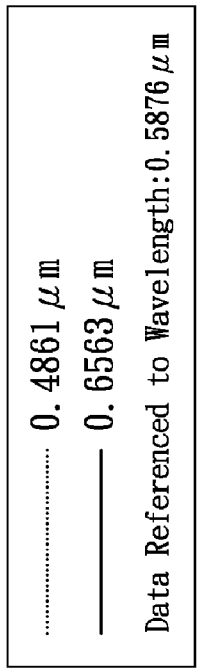
FIG. 2G is a lateral color diagram of the wide-angle lens assembly in accordance with the first embodiment of the invention.
Figure 2G:
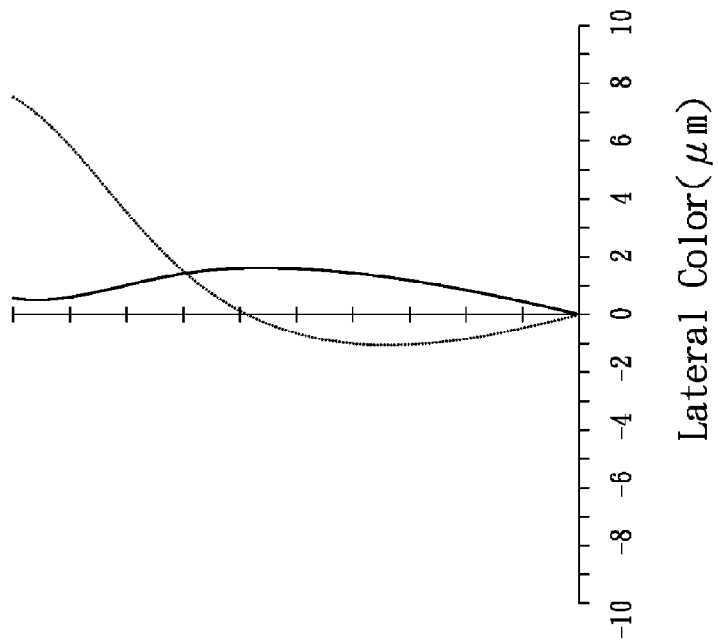

By the above arrangements of the lenses, stop ST11 and stop ST12, the wide-angle lens assembly 1 of the first embodiment can meet the requirements of optical performance as seen in FIGS. 2A-2G, wherein FIG. 2A shows a longitudinal aberration diagram of the wide-angle lens assembly 1 in accordance with the first embodiment of the invention, FIG. 2B shows a field curvature diagram of the wide-angle lens assembly 1 in accordance with the first embodiment of the invention, FIG. 2C shows a distortion diagram of the wide-angle lens assembly 1 in accordance with the first embodiment of the invention, FIGS. 2D-2F show transverse ray fan diagrams of the wide-angle lens assembly 1 in accordance with the first embodiment of the invention and FIG. 2G shows a lateral color diagram of the wide-angle lens assembly 1 in accordance with the first embodiment of the invention.

It can be seen from FIG. 2A that the longitudinal aberration in the wide-angle lens assembly 1 of the first embodiment ranges between −0.06 mm and 0.00 mm for the wavelength of 0.588 μm. It can be seen from FIG. 2B that the field curvature of tangential direction and sagittal direction in the wide-angle lens assembly 1 of the first embodiment ranges between −0.15 mm and 0.00 mm for the wavelength of 0.588 μm. It can be seen from FIG. 2C that the distortion in the wide-angle lens assembly 1 of the first embodiment ranges between −90% and 0% for the wavelength of 0.588 μm. It can be seen from FIGS. 2D-2F that the transverse ray aberration in the wide-angle lens assembly 1 of the first embodiment ranges between −10.0 μm and 9.0 μm wherein the wavelength is 0.588 μm, each field is 0.0000 mm, 1.700 mm and 2.3800 mm. It can be seen from FIG. 2G that the lateral color in the wide-angle lens assembly 1 of the first embodiment ranges between −1.0 μm and 8.0 μm for the wavelength of 0.4861 μm and 0.6563 μm and field ranges between 0 mm and 3.400 mm. It is obvious that the longitudinal aberration, the field curvature, the distortion, the transverse ray aberration and the lateral color of the wide-angle lens assembly 1 of the first embodiment can be corrected effectively. Therefore, the wide-angle lens assembly 1 of the first embodiment is capable of good optical performance.

Figure 3:
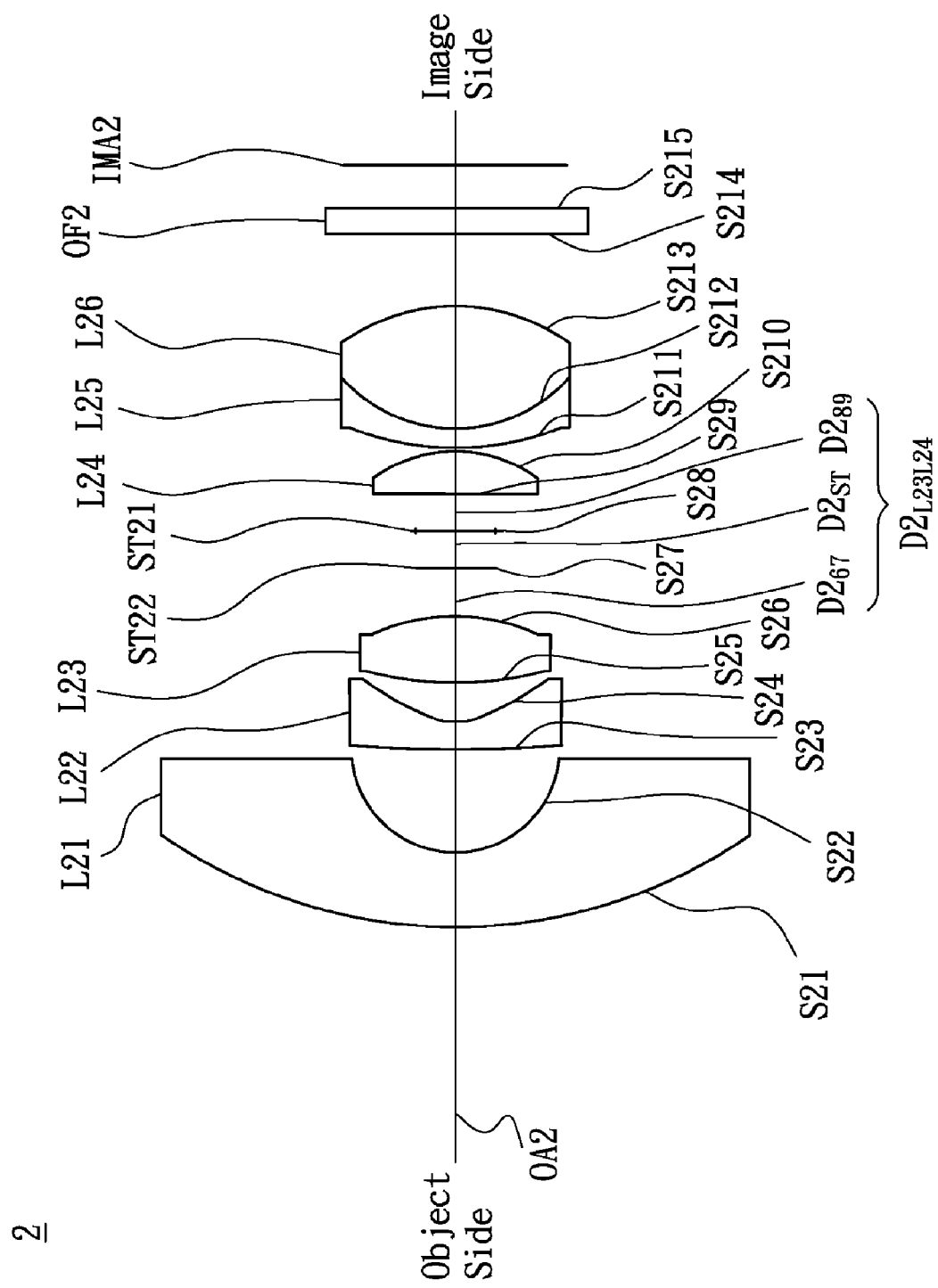
FIG. 3 is a lens layout of a wide-angle lens assembly in accordance with a second embodiment of the invention.

Referring to FIG. 3, FIG. 3 is a lens layout of a wide-angle lens assembly in accordance with a second embodiment of the invention. The wide-angle lens assembly 2 includes a first lens L21, a second lens L22, a third lens L23, a second stop ST22, a first stop ST21, a fourth lens L24, a fifth lens L25, a sixth lens L26 and an Optical filter OF2, all of which are arranged in sequence from an object side to an image side along an optical axis OA2. In operation, an image of light rays from the object side is formed at an image plane IMA2. The first lens L21 is a meniscus lens and with negative refractive power, wherein the object side surface S21 is a convex surface, the image side surface S22 is a concave surface and both of the object side surface S21 and image side surface S22 are spherical surfaces. The second lens L22 is a meniscus lens and with negative refractive power, wherein the object side surface S23 is a convex surface, the image side surface S24 is a concave surface, the object side surface S23 is a spherical surface and the image side surface S24 is an aspheric surfaces. The third lens L23 is a biconvex lens and with positive refractive power, wherein the object side surface S25 is an aspheric surface and the image side surface S26 is a spherical surface. The fourth lens L24 is a biconvex lens and with positive refractive power, wherein the object side surface S29 is an aspheric surface and the image side surface S210 is a spherical surface. The fifth lens L25 is a convex-concave lens and with negative refractive power, wherein the object side surface S211 is a convex surface, the image side surface S212 is a concave surface and both of the object side surface S211 and image side surface S212 are spherical surfaces. The sixth lens L26 is a biconvex lens and with positive refractive power, wherein both of the object side surface S212 and image side surface S213 are spherical surfaces. The image side surface S212 of the fifth lens L25 and the object side surface S212 of the sixth lens L26 are cemented so as to reduce chromatic aberration. Both of the object side surface S214 and image side surface S215 of the optical filter OF2 are plane surfaces.

In order to maintain excellent optical performance of the wide-angle lens assembly in accordance with the second embodiment of the invention, the wide-angle lens assembly 2 must satisfies the following five conditions:

$$Nd2_1R2_{11} \le 0.185 \tag{6}$$

$$46 \le Vd2_2 \le 60 \tag{7}$$

$$22.5 \le Vd2_3 \le 33.6 \tag{8}$$

$$16.1 \le Vd2_5 \le 23.9 \tag{9}$$

$$0.09 \le D2_{ST}/D2_{L23L24} \le 0.35 \tag{10}$$

wherein $Nd2_1$ is an index of refraction of the first lens L21, $R2_{11}$ is a radius of curvature of the object side surface S21 of the first lens L21, $Vd2_2$ is an Abbe number of the second lens L22, $Vd2_3$ is an Abbe number of the third lens L23, $Vd2_5$ is an Abbe number of the fifth lens L25, $D2_{ST}$ is an interval between the second stop ST22 and the first stop ST21 and $D2_{L23L24}$ is an interval between the third lens L23 and the fourth lens L24. The wide-angle lens assembly 2 satisfying condition (9) can reduce chromatic aberration significantly.

By the above design of the lenses, stop ST21 and stop ST22, the wide-angle lens assembly 2 is provided with an increased field of view and an effective corrected aberration.

In order to achieve the above purposes and effectively enhance the optical performance, the wide-angle lens assembly 2 in accordance with the second embodiment of the invention is provided with the optical specifications shown in Table 3, which include the effective focal length, field of view, radius of curvature of each lens surface, thickness between adjacent surface, refractive index of each lens and Abbe number of each lens. Table 3 shows that the effective focal length is equal to 2.036 mm and field of view is equal to 165° for the wide-angle lens assembly 2 of the second embodiment of the invention.

TABLE 3

Effective Focal Length = 2.036 mm
Field of View = 165°

| Surface Number | Radius of Curvature (mm) | Thickness (mm) | Nd | Vd | Remark |
|---|---|---|---|---|---|
| S21 | 16.339 | 2.200 | 1.7725 | 51.60 | The First Lens L21 |
| S22 | 3.200 | 3.191 | | | |
| S23 | 74.576 | 0.800 | 1.5350 | 54.71 | The Second Lens L22 |
| S24 | 2.597 | 1.160 | | | |
| S25 | 9.622 | 2.000 | 1.6142 | 29.58 | The Third Lens L23 |
| S26 | −6.159 | 1.489 | | | Interval $D2_{67}$ |
| S27 | ∞ | 1.100 | | | The Second Stop ST22 Interval $D2_{ST}$ |
| S28 | ∞ | 1.090 | | | The first Stop ST21 Interval $D2_{89}$ |
| S29 | 41.090 | 1.345 | 1.5913 | 63.14 | The Fourth Lens L24 |
| S210 | −4.320 | 0.100 | | | |
| S211 | 9.710 | 0.550 | 1.9429 | 17.90 | The Fifth Lens L25 |
| S212 | 4.583 | 3.760 | 1.4388 | 90.95 | The Sixth Lens L26 |
| S213 | −5.664 | 2.100 | | | |
| S214 | ∞ | 0.800 | 1.5168 | 64.20 | Optical Filter OF2 |
| S215 | ∞ | 1.285 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 4.

TABLE 4

| Surface Number | k | A | B | C | D |
|---|---|---|---|---|---|
| S24 | −0.482909622 | −2.6057500E−03 | −7.4802228E−04 | 1.7268449E−05 | −4.4051336E−06 |
| S25 | 0 | −2.6760090E−04 | −4.1678164E−04 | 7.1327382E−05 | −4.8110500E−06 |
| S29 | 0 | −5.0776120E−03 | 1.2955517E−03 | −4.4681899E−04 | 5.8194312E−05 |

For the wide-angle lens assembly 2 of the second embodiment, the index of refraction $Nd2_1$ of the first lens L21 is equal to 1.7725, the radius of curvature $R2_{11}$ of the object side surface S21 of the first lens L21 is equal to 16.339 mm, the Abbe number $Vd2_2$ of the second lens L22 is equal to 54.71, the Abbe number $Vd2_3$ of the third lens L23 is equal to 29.58, the Abbe number $Vd2_5$ of the fifth lens L25 is equal to 17.90, the interval $D2_{ST}$ between the second stop ST22 and the first stop ST21 is equal to 1.100 mm, and the interval $D2_{L23L24}$ between the third lens L23 and the fourth lens L24 is equal to 3.679 mm. According to the above data, the following values can be obtained:

$Nd2_1/R2_{11} = 0.108$, $Vd2_2 = 54.71$, $Vd2_3 = 29.58$, $Vd2_5 = 17.90$, $D2_{ST}/D2_{L23L24} = 0.30$ which respectively satisfy the above conditions (6)-(10).

Figure 4A:
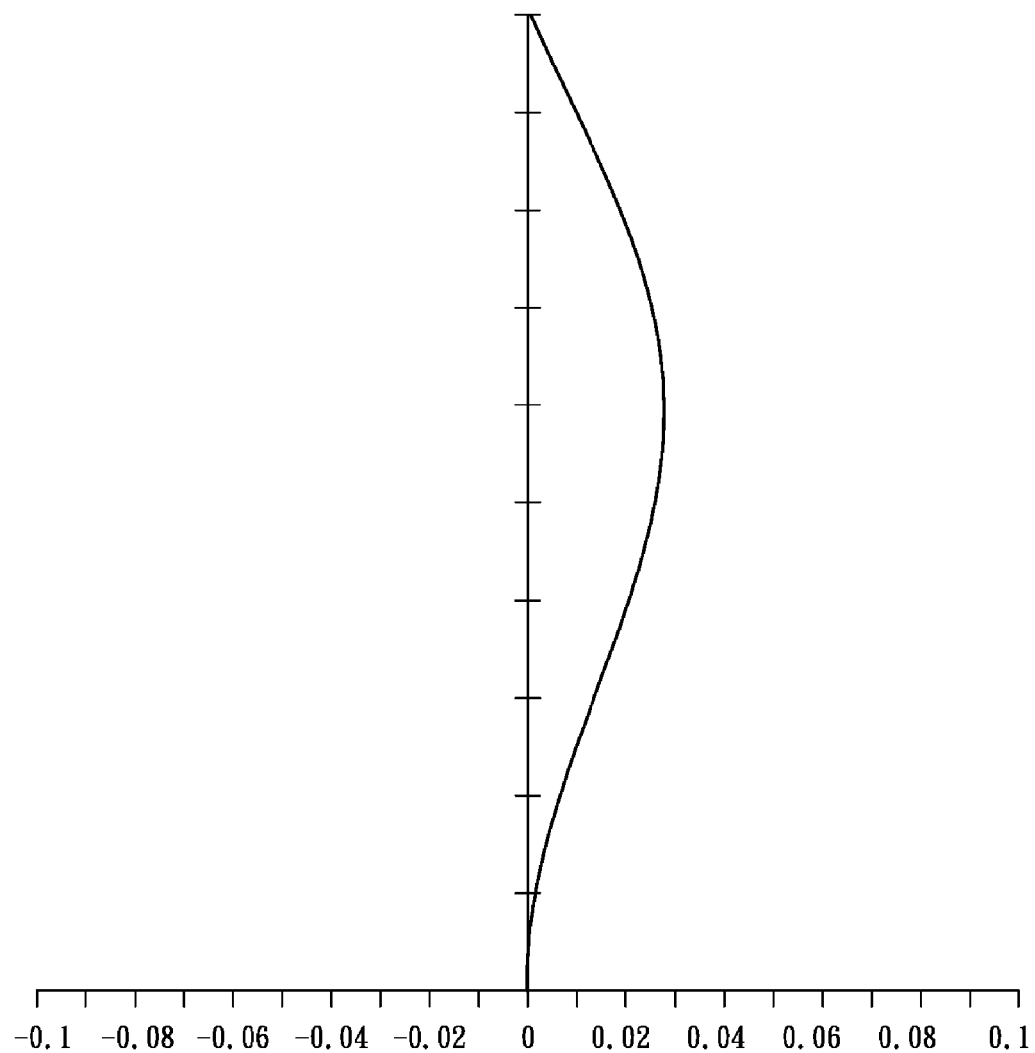
FIG. 4A depicts a longitudinal aberration diagram of the wide-angle lens assembly in accordance with the second embodiment of the invention.
Figure 4B:
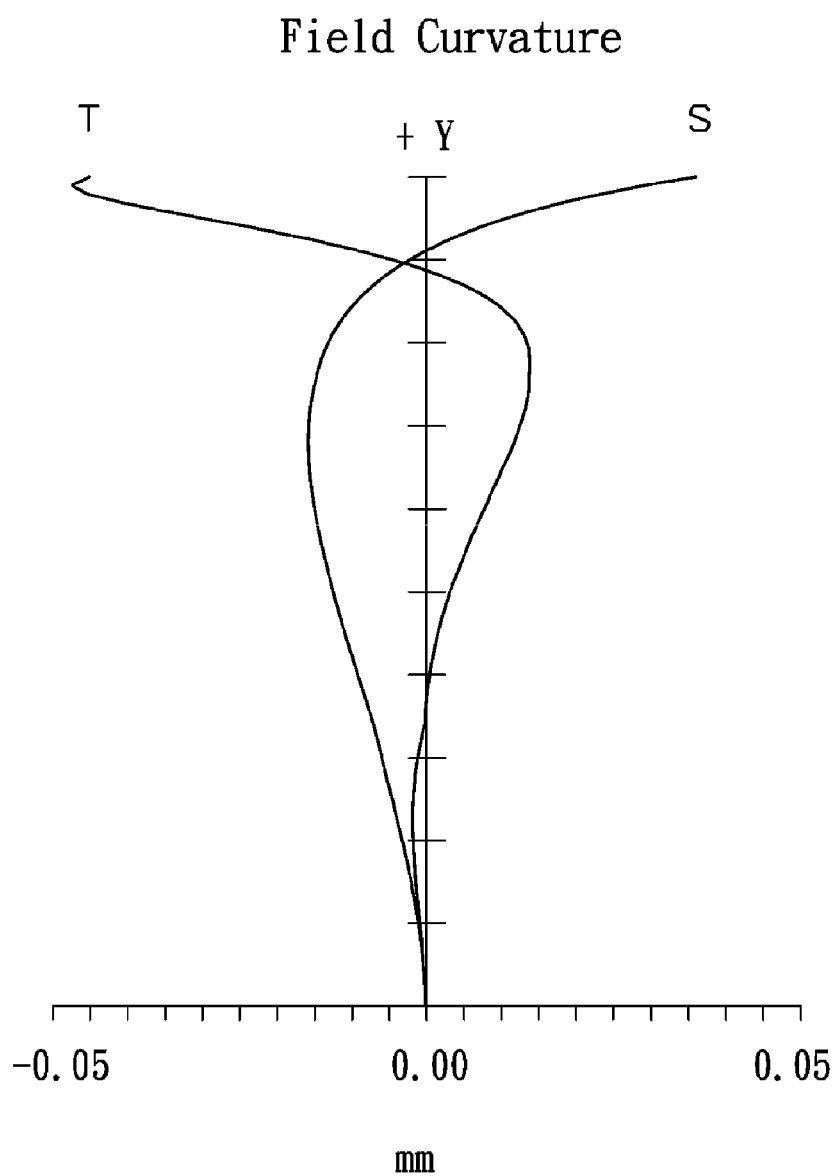
FIG. 4B is a field curvature diagram of the wide-angle lens assembly in accordance with the second embodiment of the invention.
Figure 4C:
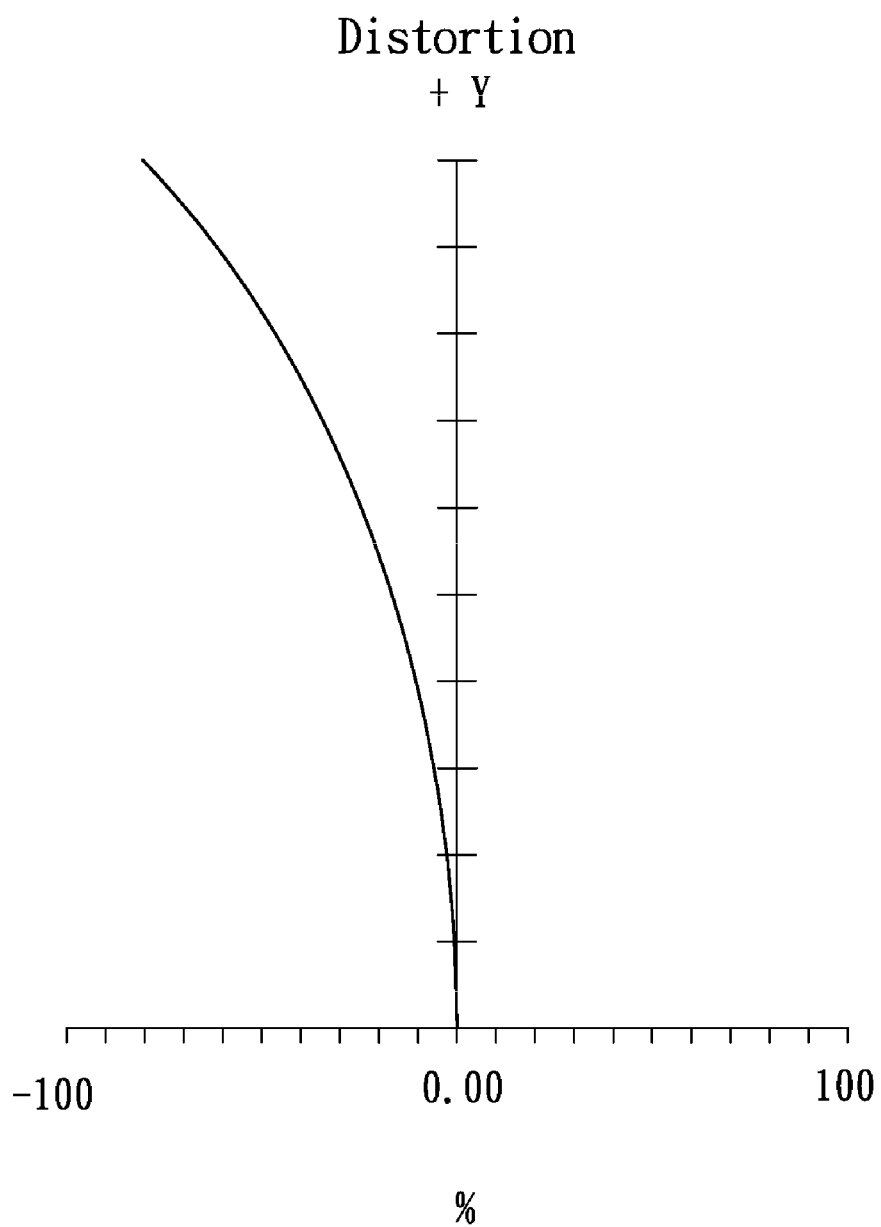
FIG. 4C is a distortion diagram of the wide-angle lens assembly in accordance with the second embodiment of the invention.
Figure 4D:
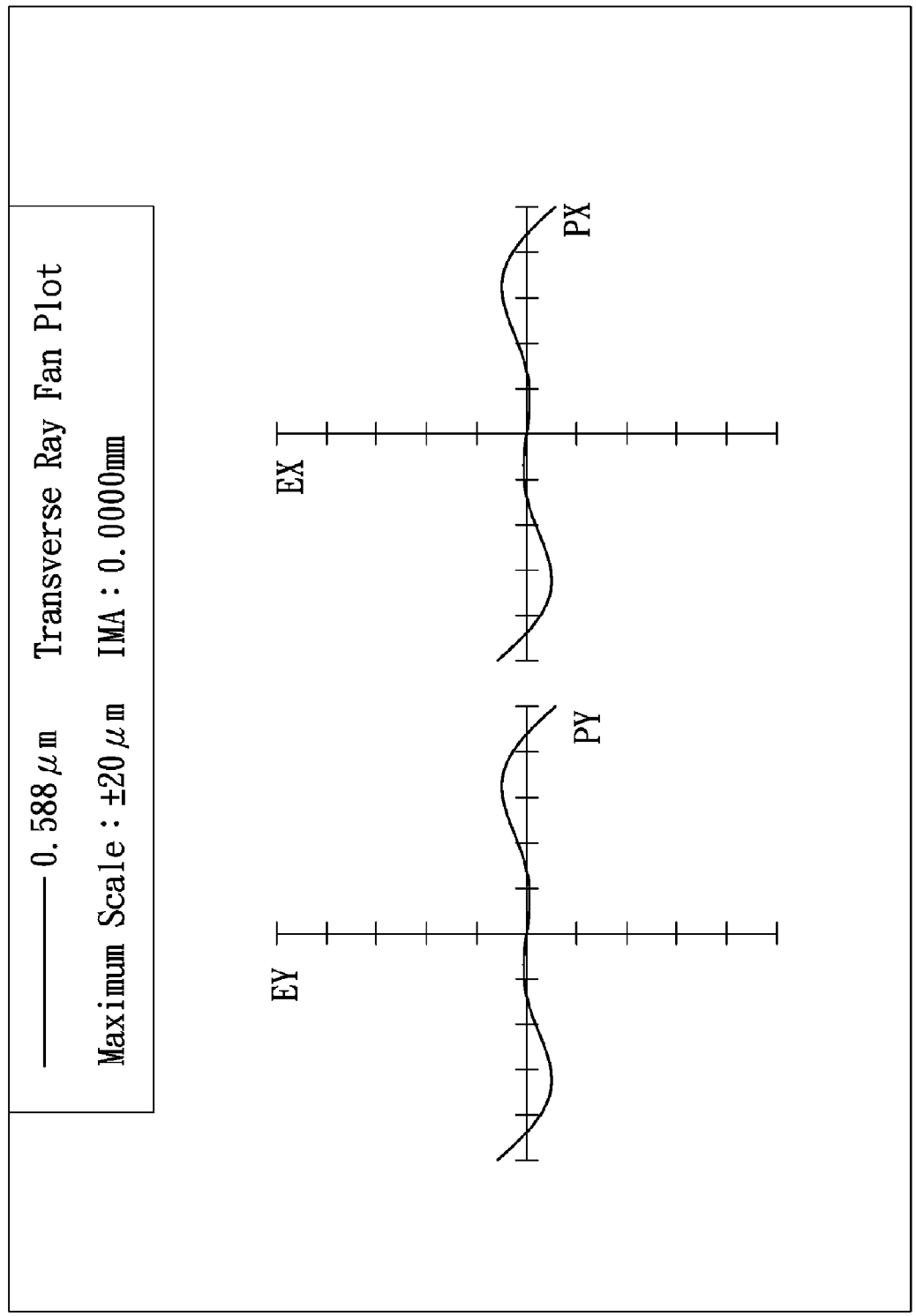
FIGS. 4D-4F are transverse ray fan diagrams of the wide-angle lens assembly in accordance with the second embodiment of the invention.
Figure 4E:
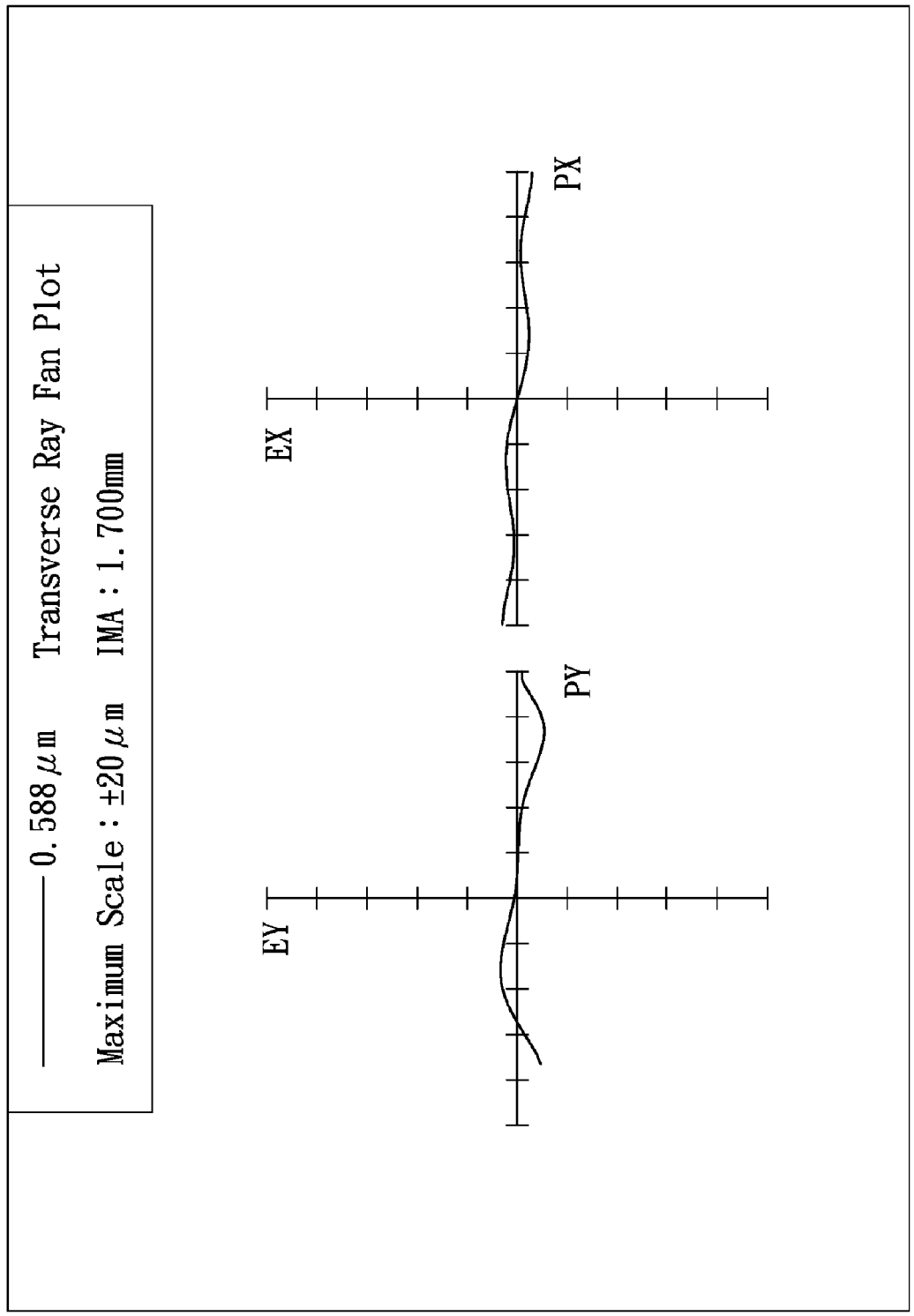
Figure 4F:
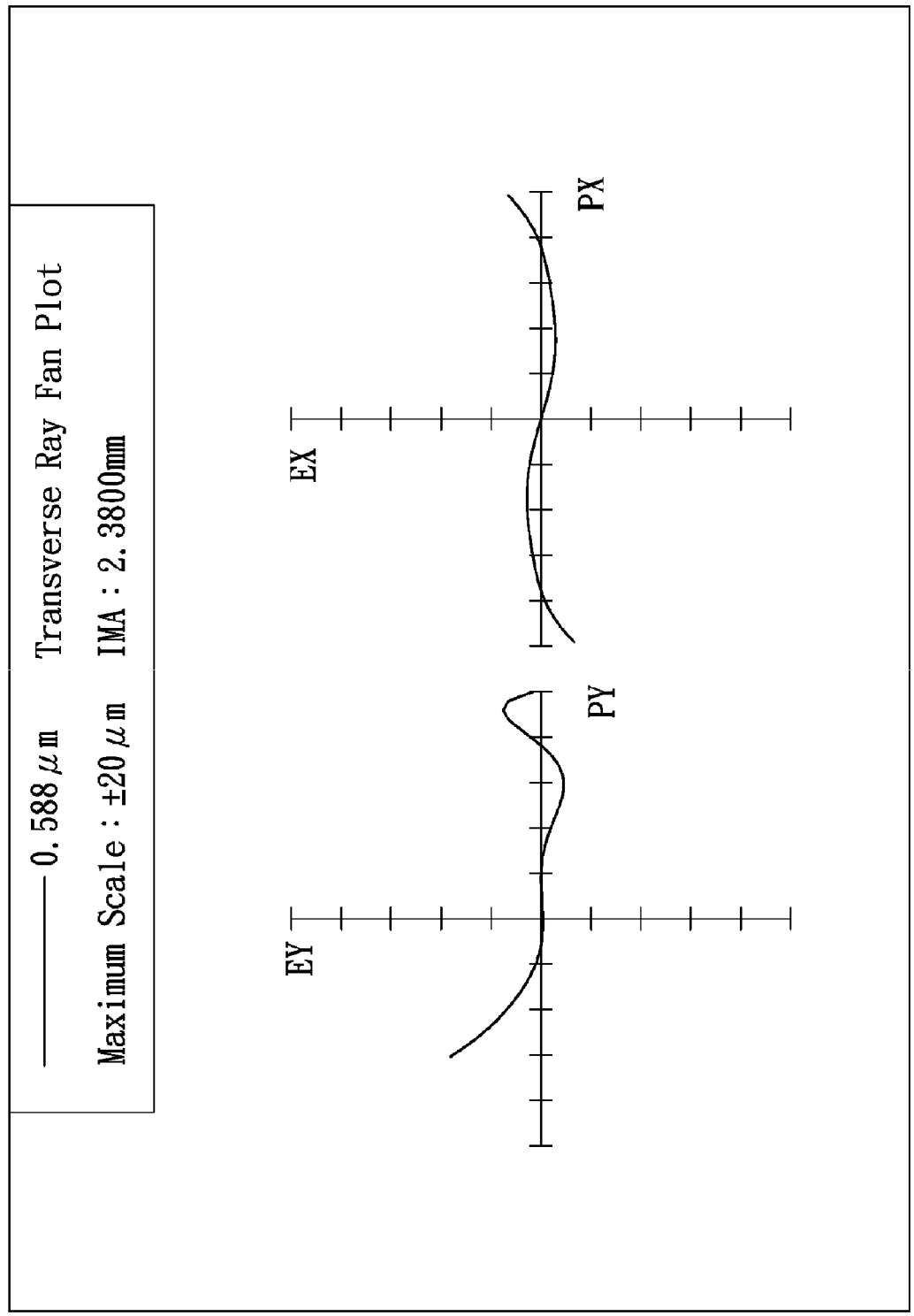
Figure 4G:
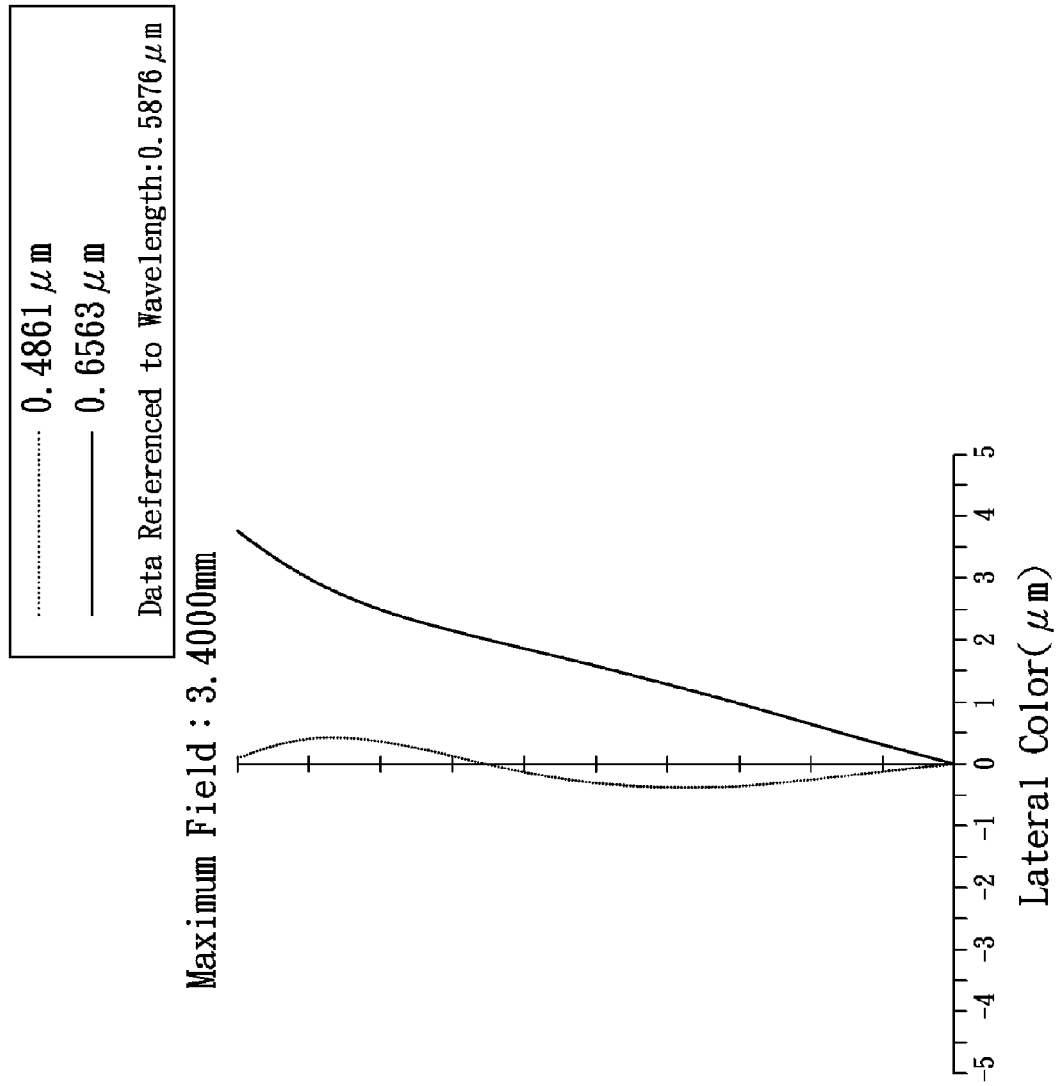
FIG. 4G is a lateral color diagram of the wide-angle lens assembly in accordance with the second embodiment of the invention.

By the above arrangements of the lenses, stop ST21 and stop ST22, the wide-angle lens assembly 2 of the second embodiment can meet the requirements of optical performance as seen in FIGS. 4A-4G, wherein FIG. 4A shows a longitudinal aberration diagram of the wide-angle lens assembly 2 in accordance with the second embodiment of the invention, FIG. 4B shows a field curvature diagram of the wide-angle lens assembly 2 in accordance with the second embodiment of the invention, FIG. 4C shows a distortion diagram of the wide-angle lens assembly 2 in accordance with the second embodiment of the invention, FIGS. 4D-4F show transverse ray fan diagrams of the wide-angle lens assembly 2 in accordance with the second embodiment of the invention and FIG. 4G shows a lateral color diagram of the wide-angle lens assembly 2 in accordance with the second embodiment of the invention.

It can be seen from FIG. 4A that the longitudinal aberration in the wide-angle lens assembly 2 of the second embodiment ranges between 0 mm and 0.03 mm for the wavelength of 0.588 μm. It can be seen from FIG. 4B that the field curvature of tangential direction and sagittal direction in the wide-angle lens assembly 2 of the second embodiment ranges between −0.05 mm and 0.04 mm for the wavelength of 0.588 μm. It can be seen from FIG. 4C that the distortion in the wide-angle lens assembly 2 of the second embodiment ranges between −85% and 0% for the wavelength of 0.588 μm. It can be seen from FIGS. 4D-4F that the transverse ray aberration in the wide-angle lens assembly 2 of the second embodiment ranges between −4.6 μm and 8.0 μm wherein the wavelength is 0.588 μm, each field is 0.0000 mm, 1.700 mm and 2.3800 mm. It can be seen from FIG. 4G that the lateral color in the wide-angle lens assembly 2 of the second embodiment ranges between −0.5 μm and 4.0 μm for the wavelength of 0.4861 μm and 0.6563 μm and field ranges between 0 mm and 3.400 mm. It is obvious that the longitudinal aberration, the field curvature, the distortion, the transverse ray aberration and the lateral color of the wide-angle lens assembly 2 of the second embodiment can be corrected effectively. Therefore, the wide-angle lens assembly 2 of the second embodiment is capable of good optical performance.

Figure 5:
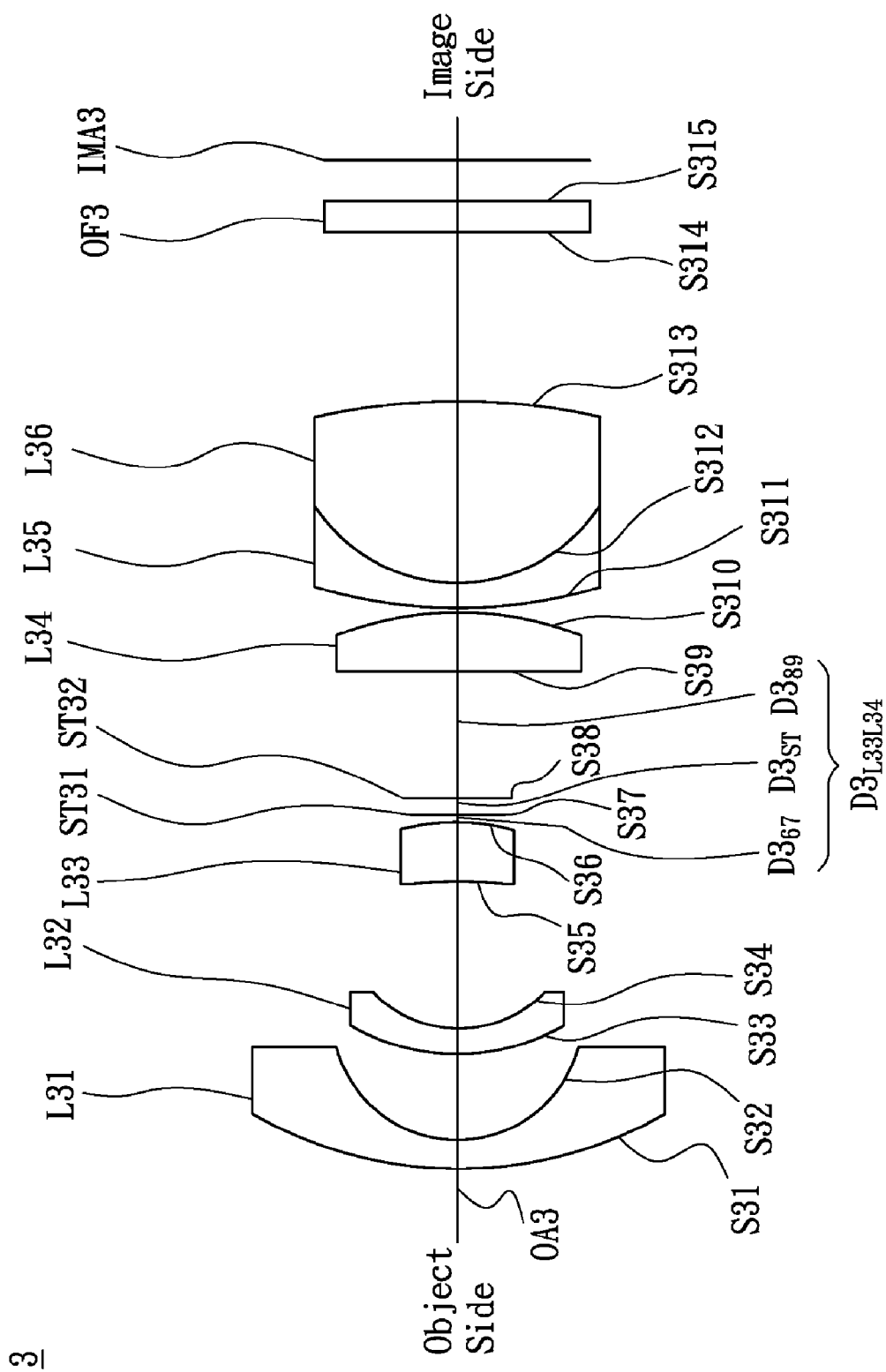
FIG. 5 is a lens layout of a wide-angle lens assembly in accordance with a third embodiment of the invention.

Referring to FIG. 5, FIG. 5 is a lens layout of a wide-angle lens assembly in accordance with a third embodiment of the invention. The wide-angle lens assembly 3 includes a first lens L31, a second lens L32, a third lens L33, a first stop ST31, a second stop ST32, a fourth lens L34, a fifth lens L35, a sixth lens L36 and an Optical filter OF3, all of which are arranged in sequence from an object side to an image side along an optical axis OA3. In operation, an image of light rays from the object side is formed at an image plane IMA3. The first lens L31 is a meniscus lens and with negative refractive power, wherein the object side surface S31 is a convex surface, the image side surface S32 is a concave surface and both of the object side surface S31 and image side surface S32 are spherical surfaces. The second lens L32 is a meniscus lens and with negative refractive power, wherein the object side surface S33 is a convex surface, the image side surface S34 is a concave surface and both of the object side surface S33 and image side surface S34 are spherical surfaces. The third lens L33 is with positive refractive power, wherein the object side surface S35 is a concave surface, the image side surface S36 is a convex surface and both of the object side surface S35 and image side surface S36 are spherical surfaces. The fourth lens L34 is a biconvex lens and with positive refractive power, wherein both of the object side surface S39 and image side surface S310 are spherical surfaces. The fifth lens L35 is a convex-concave lens and with negative refractive power, wherein the object side surface S311 is a convex surface, the image side surface S312 is a concave surface and both of the object side surface S311 and image side surface S312 are spherical surfaces. The sixth lens L36 is a biconvex lens and with positive refractive power, wherein both of the object side surface S312 and image side surface S313 are spherical surfaces. The image side surface S312 of the fifth lens L35 and the object side surface S312 of the sixth lens L36 are cemented so as to reduce chromatic aberration. Both of the object side surface S314 and image side surface S315 of the optical filter OF3 are plane surfaces.

In order to maintain excellent optical performance of the wide-angle lens assembly in accordance with the third embodiment of the invention, the wide-angle lens assembly 3 must satisfies the following five conditions:

$$Nd3_1/R3_{11} \le 0.185 \quad (11)$$

$$46 \le Vd3_2 \le 60 \quad (12)$$

$$22.5 \le Vd3_3 \le 33.6 \quad (13)$$

$$16.1 \le Vd3_5 \le 23.9 \quad (14)$$

$$0.09 \le D3_{ST}/D3_{L33L34} \le 0.35 \quad (15)$$

wherein $Nd3_1$ is an index of refraction of the first lens L31, $R3_{11}$ is a radius of curvature of the object side surface S31 of the first lens L31, $Vd3_2$ is an Abbe number of the second lens L32, $Vd3_3$ is an Abbe number of the third lens L33, $Vd3_5$ is an Abbe number of the fifth lens L35, $D3_{ST}$ is an interval between the first stop ST31 and the second stop ST32 and $D3_{L33L34}$ is an interval between the third lens L33 and the fourth lens L34. The wide-angle lens assembly 3 satisfying condition (14) can reduce chromatic aberration significantly.

By the above design of the lenses, stop ST31 and stop ST32, the wide-angle lens assembly 3 is provided with an increased field of view and an effective corrected aberration.

In order to achieve the above purposes and effectively enhance the optical performance, the wide-angle lens assembly 3 in accordance with the third embodiment of the invention is provided with the optical specifications shown in Table 5, which include the effective focal length, field of view, radius of curvature of each lens surface, thickness between adjacent surface, refractive index of each lens and Abbe number of each lens. Table 5 shows that the effective focal length is equal to 2.4025 mm and field of view is equal to 150° for the wide-angle lens assembly 3 of the third embodiment of the invention.

TABLE 5

Effective Focal Length = 2.4025 mm
Field of View = 150°

| Surface Number | Radius of Curvature (mm) | Thickness (mm) | Nd | Vd | Remark |
|---|---|---|---|---|---|
| S31 | 10.000 | 0.7 | 1.7900 | 54.32 | The First Lens L31 |
| S32 | 2.980 | 2.04 | | | |
| S33 | 5.336 | 0.6 | 2.0500 | 46.00 | The Second Lens L32 |
| S34 | 2.980 | 3.477516 | | | |
| S35 | −14.021 | 1.4 | 1.8366 | 25.20 | The Third Lens L33 |
| S36 | −5.154 | 0.18765 | | | Interval $D3_{67}$ |
| S37 | ∞ | 0.4 | | | The First Stop ST31 Interval $D3_{ST}$ |
| S38 | ∞ | 2.996662 | | | The Second Stop ST32 Interval $D3_{89}$ |
| S39 | 871.324 | 1.4 | 1.6088 | 70.84 | The Fourth Lens L34 |
| S310 | −7.966 | 0.1 | | | |
| S311 | 12.661 | 0.6 | 1.9467 | 22.32 | The Fifth Lens L35 |
| S312 | 4.069 | 4.3 | 1.7696 | 65.29 | The Sixth Lens L36 |
| S313 | −16.770 | 4 | | | |
| S314 | ∞ | 0.75 | 1.5168 | 64.20 | Optical Filter OF3 |
| S315 | ∞ | 0.99 | | | |

For the wide-angle lens assembly 3 of the third embodiment, the index of refraction $Nd3_1$ of the first lens L31 is equal to 1.7900, the radius of curvature $R3_{11}$ of the object side surface S31 of the first lens L31 is equal to 10.000 mm, the Abbe number $Vd3_2$ of the second lens L32 is equal to 46.00, the Abbe number $Vd3_3$ of the third lens L33 is equal to 25.20, the Abbe number $Vd3_5$ of the fifth lens L35 is equal to 22.32, the interval $D3_{ST}$ between the first stop ST31 and the second stop ST32 is equal to 0.400 mm, and the interval $D3_{L33L34}$ between the third lens L33 and the fourth lens L34 is equal to 3.584 mm. According to the above data, the following values can be obtained:

$$Nd3_1/R3_{11} = 0.179,$$

$$Vd3_2 = 46.00,$$

$$Vd3_3 = 25.20,$$

$$Vd3_5 = 22.32,$$

$$D3_{ST}/D3_{L33L34} = 0.11$$

which respectively satisfy the above conditions (11)-(15).

Figure 6A:
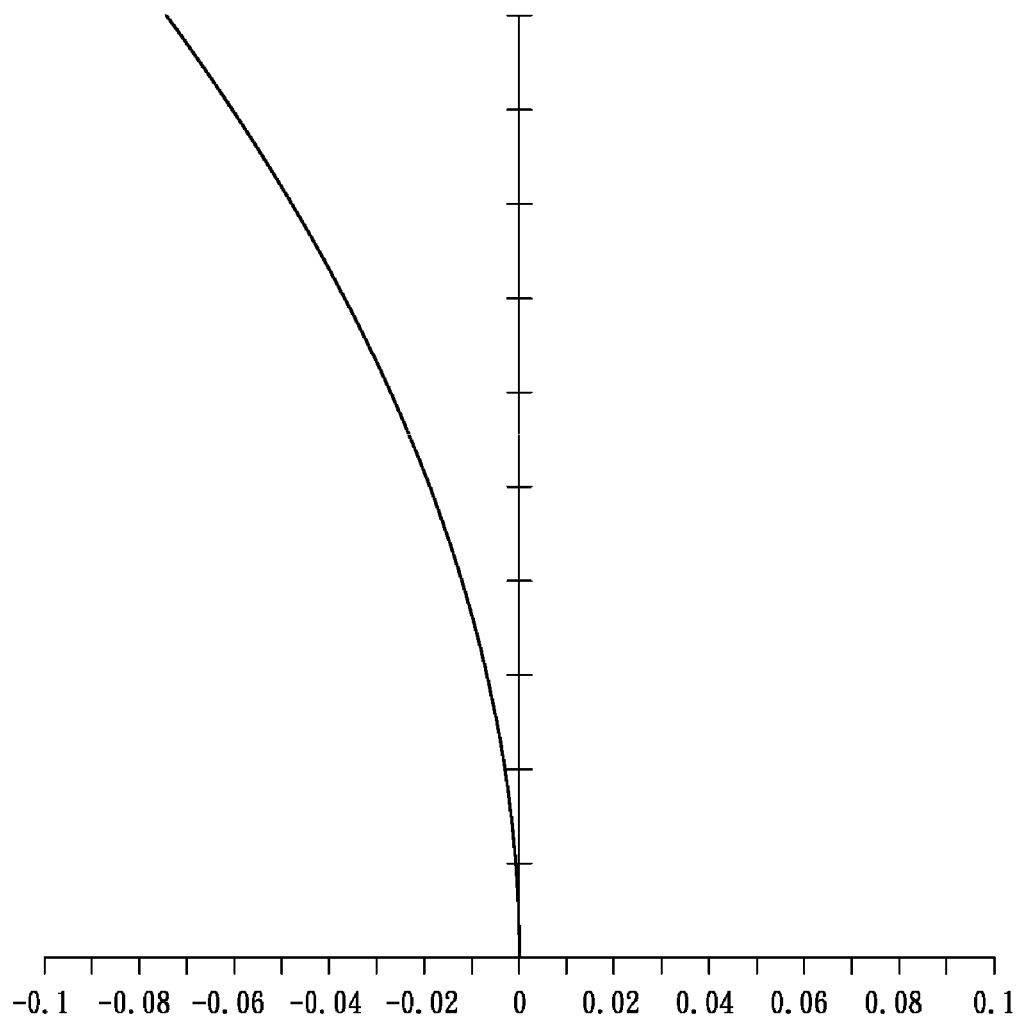
FIG. 6A depicts a longitudinal aberration diagram of the wide-angle lens assembly in accordance with the third embodiment of the invention.
Figure 6B:
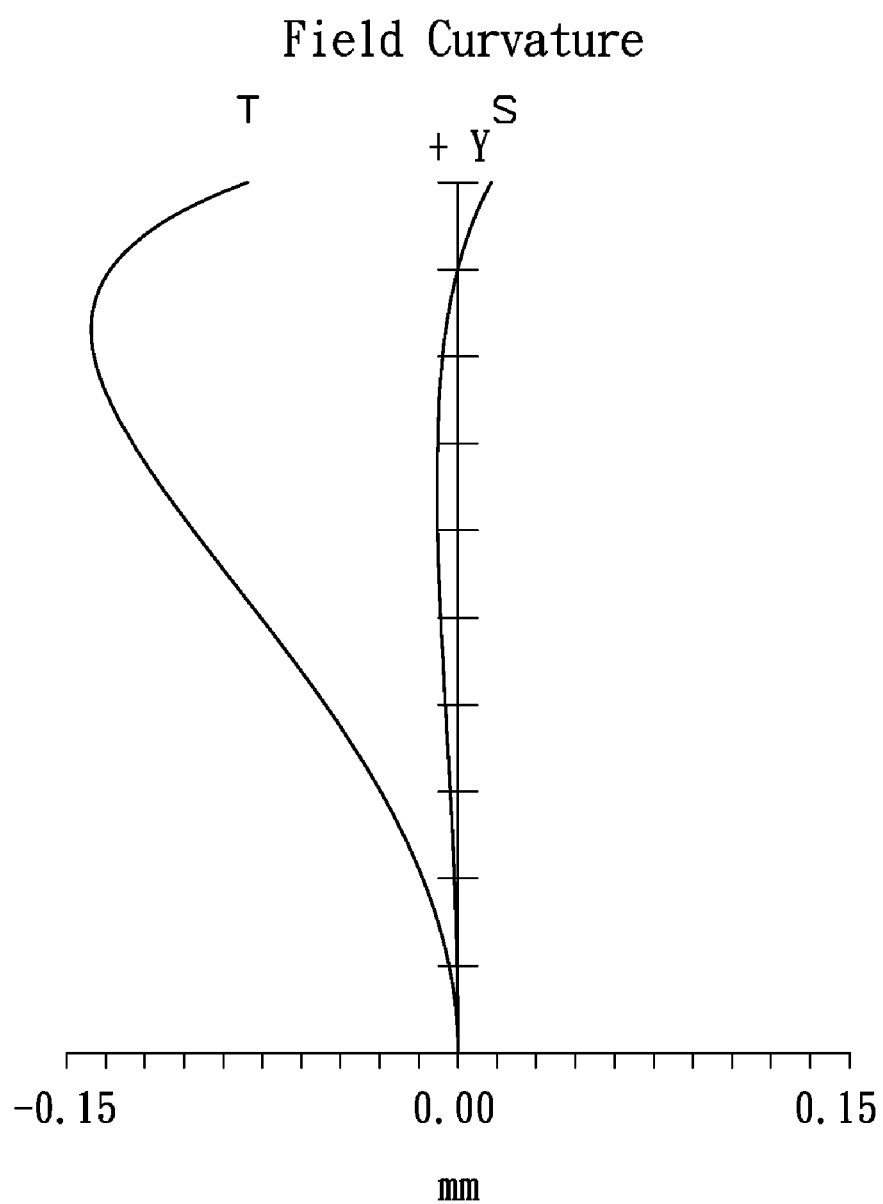
FIG. 6B is a field curvature diagram of the wide-angle lens assembly in accordance with the third embodiment of the invention.
Figure 6C:
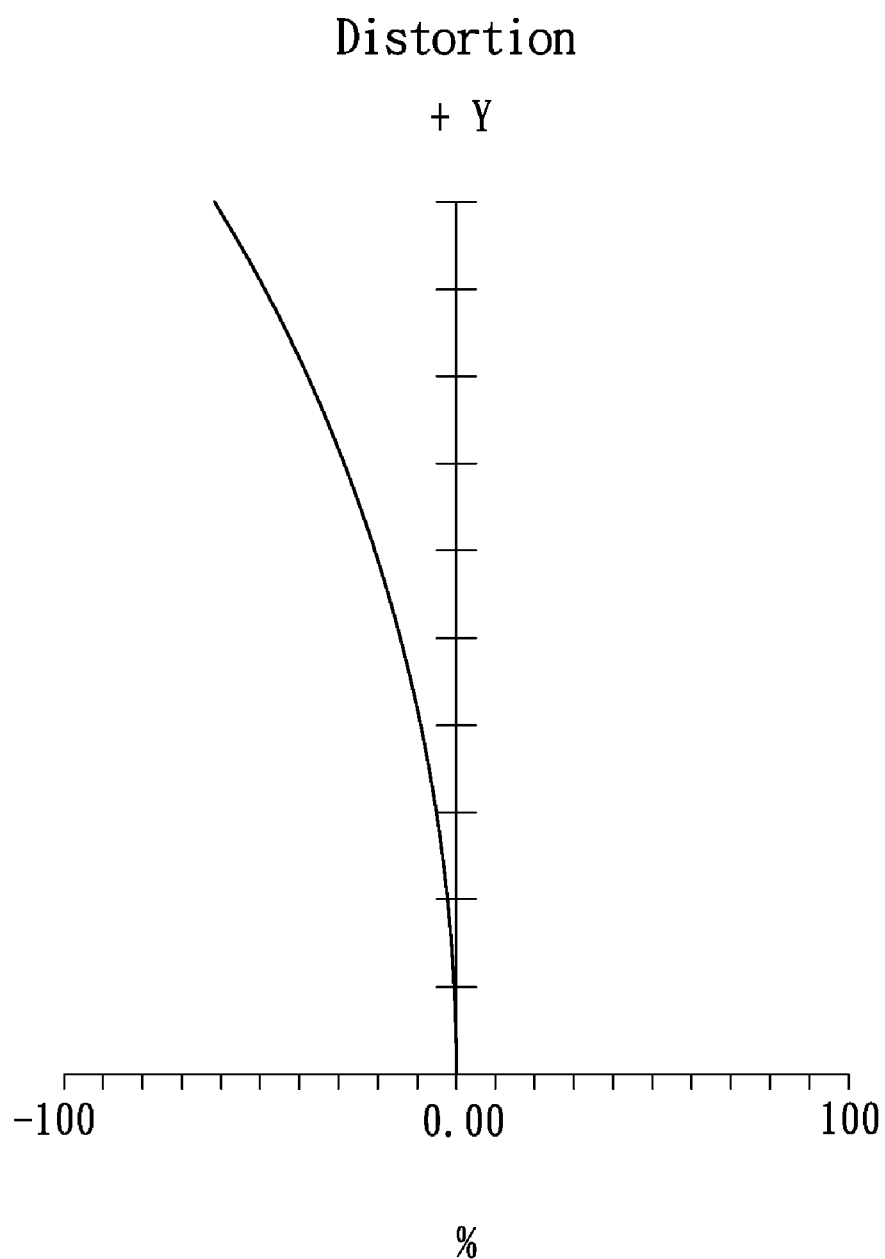
FIG. 6C is a distortion diagram of the wide-angle lens assembly in accordance with the third embodiment of the invention.
Figure 6D:
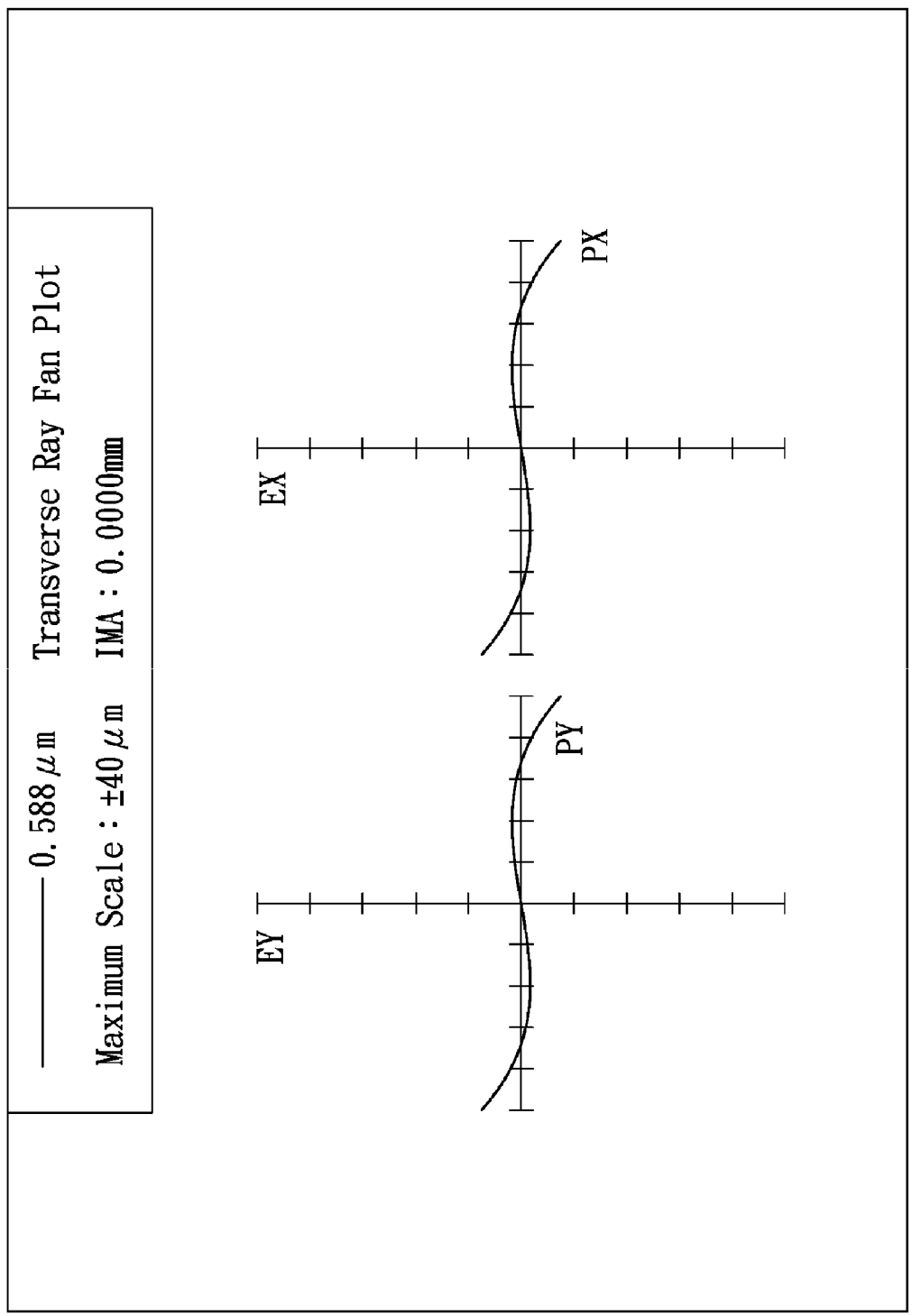
FIGS. 6D-6F are transverse ray fan diagrams of the wide-angle lens assembly in accordance with the third embodiment of the invention.
Figure 6E:
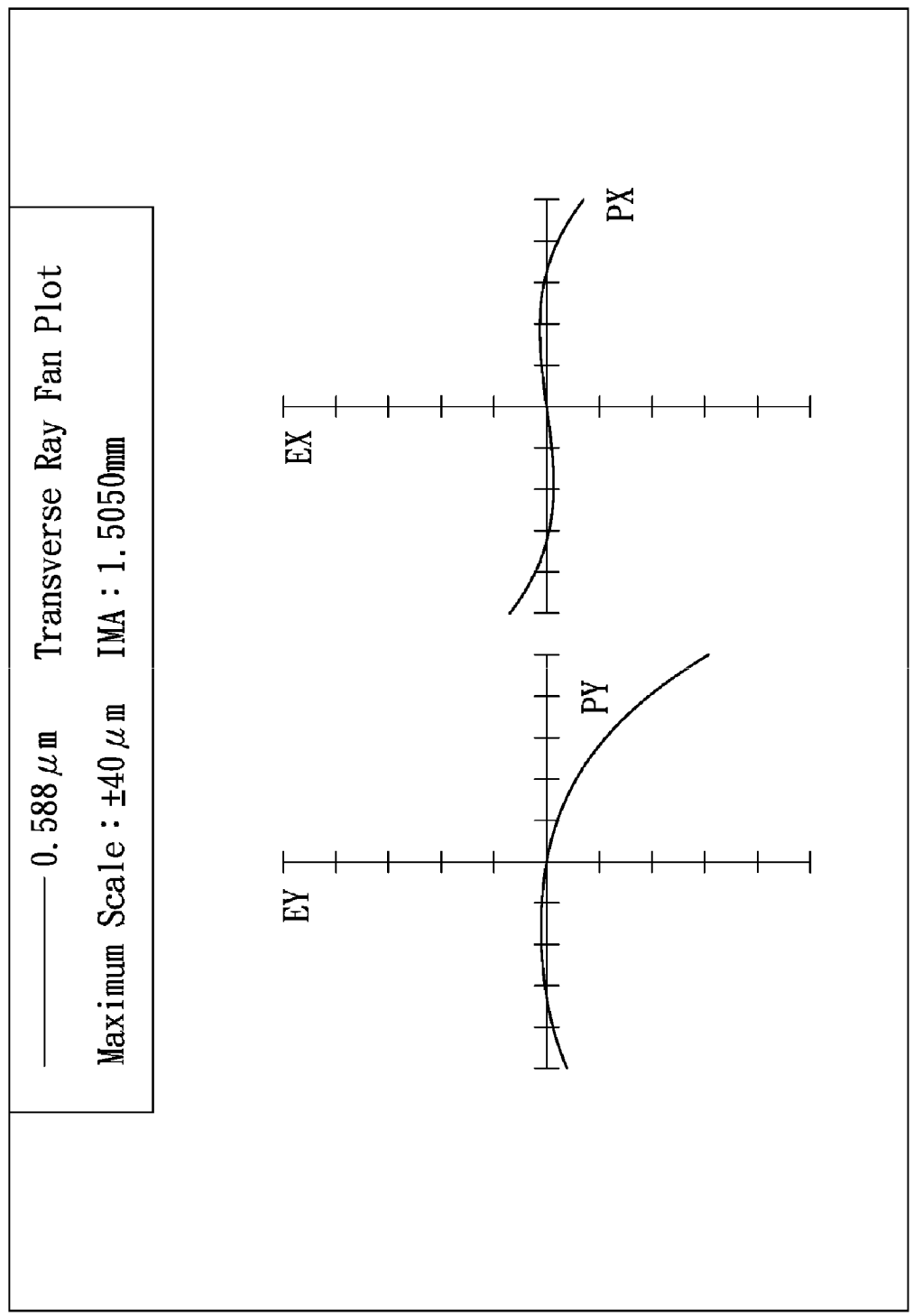
Figure 6F:
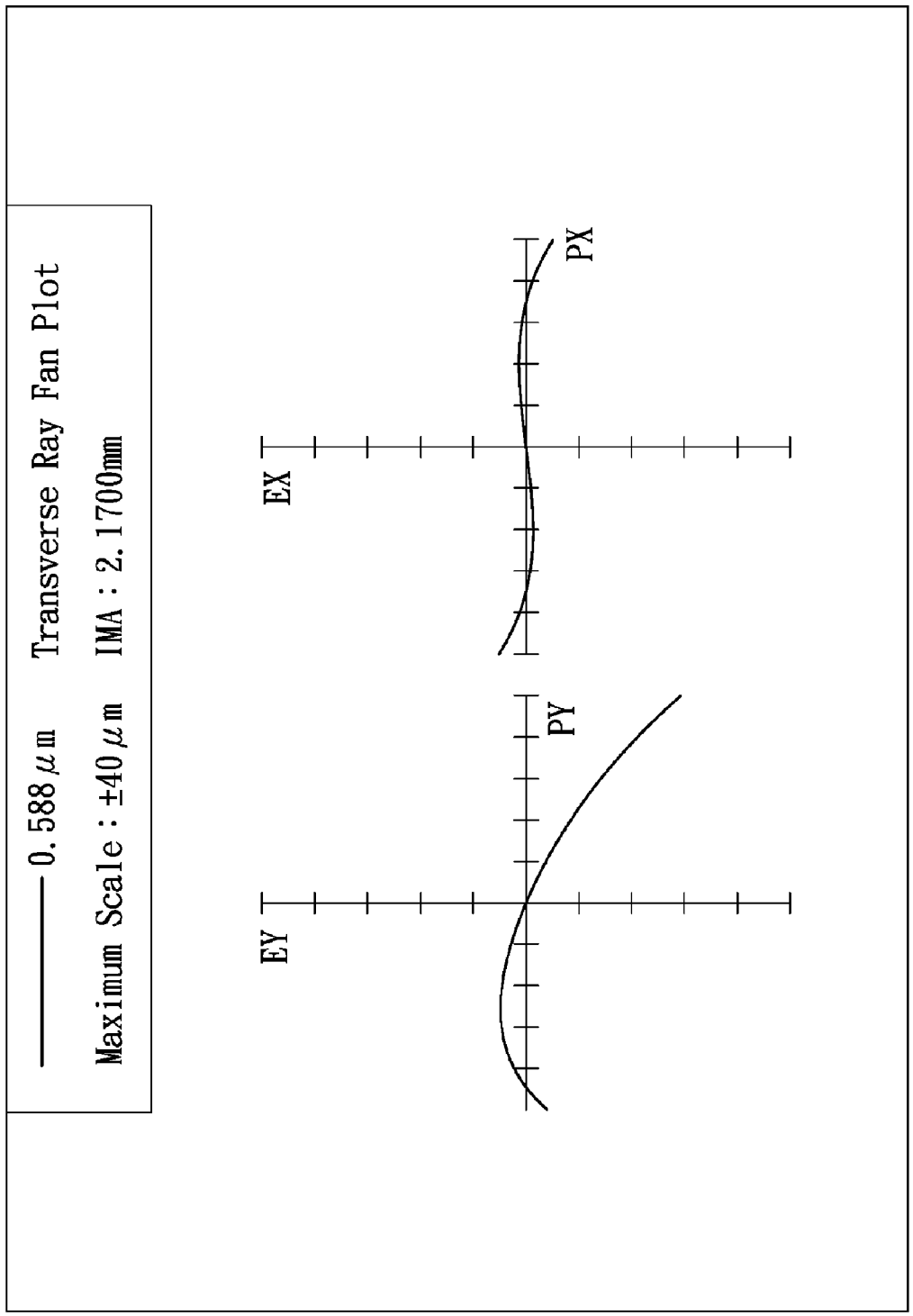
Figure 6G:
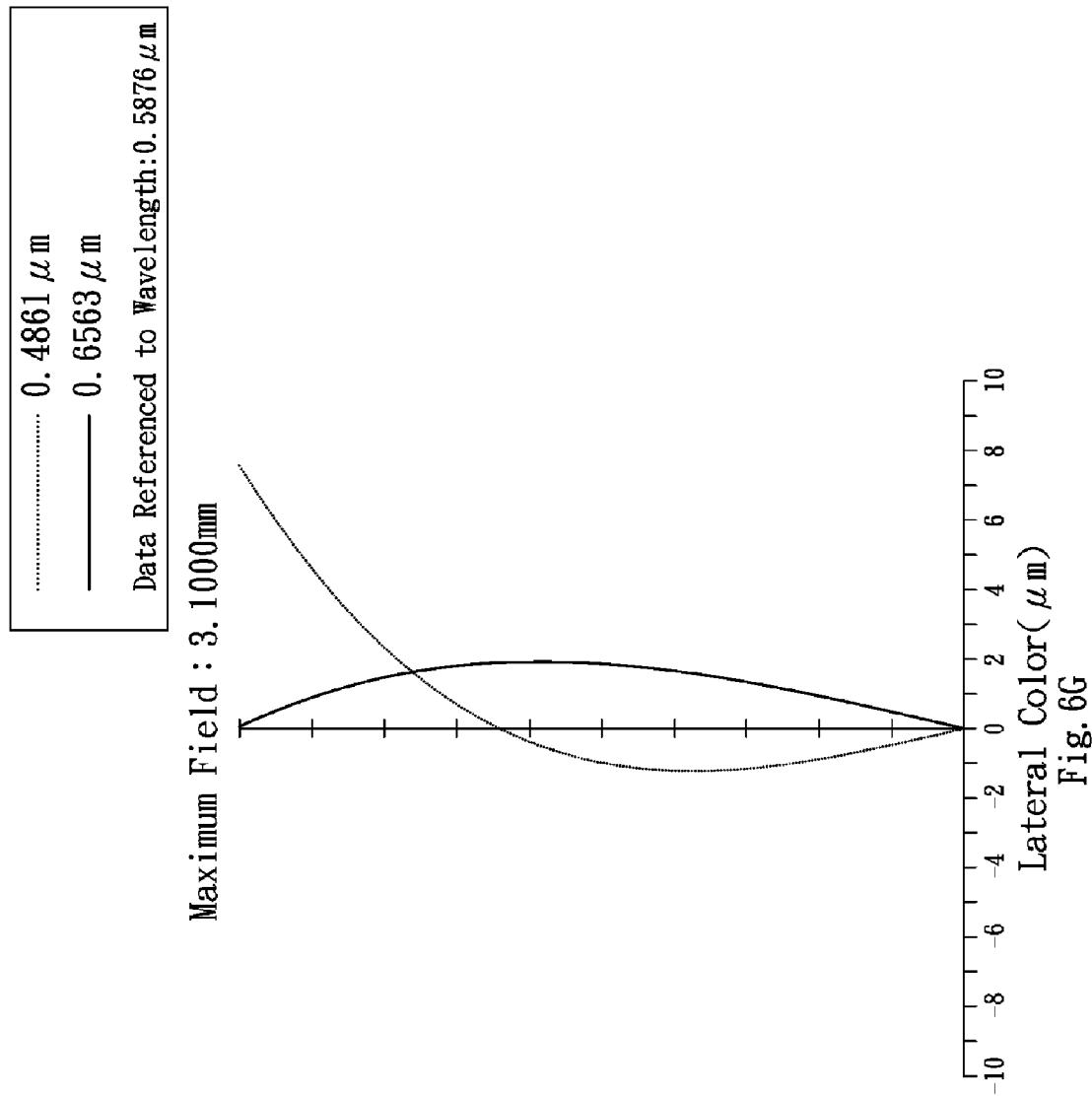
FIG. 6G is a lateral color diagram of the wide-angle lens assembly in accordance with the third embodiment of the invention.

By the above arrangements of the lenses, stop ST31 and stop ST32, the wide-angle lens assembly 3 of the third embodiment can meet the requirements of optical performance as seen in FIGS. 6A-6G, wherein FIG. 6A shows a longitudinal aberration diagram of the wide-angle lens assembly 3 in accordance with the third embodiment of the invention, FIG. 6B shows a field curvature diagram of the wide-angle lens assembly 3 in accordance with the third embodiment of the invention, FIG. 6C shows a distortion diagram of the wide-angle lens assembly 3 in accordance with the third embodiment of the invention, FIGS. 6D-6F show transverse ray fan diagrams of the wide-angle lens assembly 3 in accordance with the third embodiment of the invention and FIG. 6G shows a lateral color diagram of the wide-angle lens assembly 3 in accordance with the third embodiment of the invention.

It can be seen from FIG. 6A that the longitudinal aberration in the wide-angle lens assembly 3 of the third embodiment ranges between −0.08 mm and 0.00 mm for the wavelength of 0.588 μm. It can be seen from FIG. 6B that the field curvature of tangential direction and sagittal direction in the wide-angle lens assembly 3 of the third embodiment ranges between −0.15 mm and 0.015 mm for the wavelength of 0.588 μm. It can be seen from FIG. 6C that the distortion in the wide-angle lens assembly 3 of the third embodiment ranges between −65% and 0% for the wavelength of 0.588 μm. It can be seen from FIGS. 6D-6F that the transverse ray aberration in the wide-angle lens assembly 3 of the third embodiment ranges between −24.0 μm and 8.0 μm wherein the wavelength is 0.588 μm, each field is 0.0000 mm, 1.7000 mm and 2.3800 mm. It can be seen from FIG. 6G that the lateral color in the wide-angle lens assembly 3 of the third embodiment ranges between −1.5 μm and 7.5 μm for the wavelength of 0.4861 μm and 0.6563 μm and field ranges between 0 mm and 3.1000 mm. It is obvious that the longitudinal aberration, the field curvature, the distortion, the transverse ray aberration and the lateral color of the wide-angle lens assembly 3 of the third embodiment can be corrected effectively. Therefore, the wide-angle lens assembly 3 of the third embodiment is capable of good optical performance.

In the above embodiment, the fifth lens and the sixth lens are cemented to form a cemented lens. However, it has the same effect and falls into the scope of the invention that there is no air space between the fifth lens and the sixth lens.

What is claimed is:

1. A wide-angle lens assembly comprising a first lens, a second lens, a third lens, a first stop, a second stop, a fourth lens, a fifth lens and a sixth lens, all of which are arranged in sequence from an object side to an image side along an optical axis, wherein:
the first lens is with negative refractive power;
the second lens is with negative refractive power;
the third lens is with positive refractive power;
the fourth lens is with positive refractive power;
the fifth lens is with negative refractive power;
the sixth lens is with positive refractive power;
the fifth lens satisfies:

$16.1 \leq Vd_5 \leq 23.9$ wherein $Vd_5$ is an Abbe number of the fifth lens;
the second stop is disposed between the third lens and the fourth lens; and
the third lens, the fourth lens, the first stop and the second stop satisfy:

$0.09 \leq D_{ST}/D_{L3L4} \leq 0.35$ wherein $D_{ST}$ is an interval between the first stop and the second stop and $D_{L3L4}$ is an interval between the third lens and the fourth lens.

2. The wide-angle lens assembly as claimed in claim 1, wherein the first lens satisfies:

$Nd_1/R_{11} \leq 0.185$ wherein $Nd_1$ is an index of refraction of the first lens and $R_{11}$ is a radius of curvature of an object side surface of the first lens.

3. The wide-angle lens assembly as claimed in claim 1, wherein:
the first lens is a meniscus lens and comprises a convex surface facing the object side;
the second lens is a meniscus lens and comprises a convex surface facing the object side; and
the second lens satisfies:

$46 \leq Vd_2 \leq 60$ wherein $Vd_2$ is an Abbe number of the second lens.

4. The wide-angle lens assembly as claimed in claim 1, wherein the third lens satisfies:

$22.5 \leq Vd_3 \leq 33.6$ wherein $Vd_3$ is an Abbe number of the third lens.

5. The wide-angle lens assembly as claimed in claim 1, wherein the fourth lens further comprises a convex surface facing the image side.

6. The wide-angle lens assembly as claimed in claim 1, wherein the fifth lens and the sixth lens are cemented.

7. The wide-angle lens assembly as claimed in claim 1, wherein no air space exists between the fifth lens and the sixth lens.

8. The wide-angle lens assembly as claimed in claim 1, wherein:
the fifth lens is a convex-concave lens and comprises a convex surface facing the object side and a concave surface facing the image side; and
the sixth lens is a biconvex lens.

9. The wide-angle lens assembly as claimed in claim 1, wherein the wide-angle lens assembly satisfies:

FOV≤172 degrees, wherein FOV is a field of view of the wide-angle lens assembly.

10. The wide-angle lens assembly as claimed in claim 1, wherein the wide-angle lens assembly satisfies:

FOV≤140 degrees, wherein FOV is a field of view of the wide-angle lens assembly.

11. The wide-angle lens assembly as claimed in claim 10, wherein the wide-angle lens assembly further satisfies:

FOV≤172 degrees, wherein FOV is a field of view of the wide-angle lens assembly.

12. The wide-angle lens assembly as claimed in claim 10, wherein the wide-angle lens assembly further satisfies:

FOV≥150 degrees, wherein FOV is a field of view of the wide-angle lens assembly.

13. The wide-angle lens assembly as claimed in claim 12, wherein the wide-angle lens assembly further satisfies:

FOV≤172 degrees, wherein FOV is a field of view of the wide-angle lens assembly.

* * * * *